United States Patent [19]

Thompson

[11] Patent Number: 4,661,862
[45] Date of Patent: Apr. 28, 1987

[54] DIFFERENTIAL PCM VIDEO TRANSMISSION SYSTEM EMPLOYING HORIZONTALLY OFFSET FIVE PIXEL GROUPS AND DELTA SIGNALS HAVING PLURAL NON-LINEAR ENCODING FUNCTIONS

[75] Inventor: Charles R. Thompson, Morrestown Township, Burlington County, N.J.

[73] Assignee: RCA Corporation, Princeton, N.J.

[21] Appl. No.: 604,501

[22] Filed: Apr. 27, 1984

[51] Int. Cl.[4] .................. H04N 5/92; H04N 7/13; H04N 7/12

[52] U.S. Cl. .................. 358/335; 358/133; 358/135; 375/122; 360/9.1; 360/32; 360/33.1

[58] Field of Search ............ 358/335, 133, 135, 141, 358/263, 13, 12, 310, 11, 137, 140, 138; 375/26-27, 122; 360/9.1, 32, 33.1

[56] References Cited

U.S. PATENT DOCUMENTS

| | | |
|---|---|---|
| 2,905,756 | 9/1959 | Graham. |
| 2,921,124 | 1/1960 | Graham. |
| 3,403,226 | 9/1968 | Wintringham ............ 375/27 X |
| 3,715,722 | 2/1973 | Hall .................. 358/135 X |
| 3,739,083 | 6/1973 | Leiboff et al. ............ 375/122 X |
| 3,769,451 | 10/1973 | Connor. |
| 3,772,458 | 11/1973 | May et al. .................. 358/135 |
| 3,784,737 | 1/1974 | Waehner ............ 358/135 X |
| 3,825,832 | 7/1974 | Frei et al. .................. 358/135 |
| 4,155,097 | 5/1979 | Lux .................. 358/135 |
| 4,200,886 | 4/1980 | Musmann et al. . |
| 4,204,227 | 5/1980 | Gurley .................. 358/133 X |
| 4,334,246 | 6/1982 | Saran. |
| 4,353,096 | 10/1982 | Sakurai .................. 358/263 |
| 4,429,327 | 1/1984 | Oakley et al. ............ 358/16 X |
| 4,430,670 | 2/1984 | Metravali. |
| 4,438,452 | 3/1984 | Powers .................. 358/13 |
| 4,468,708 | 8/1984 | Coleman, Jr. ............ 358/135 X |
| 4,531,151 | 7/1985 | Hentschke .................. 358/135 |
| 4,541,012 | 9/1985 | Tescher .................. 358/133 |
| 4,551,754 | 11/1985 | Meise et al. ............ 358/12 X |
| 4,562,426 | 12/1985 | Forney, Jr. .................. 375/27 X |
| 4,562,467 | 12/1985 | Bradley .................. 358/135 |

FOREIGN PATENT DOCUMENTS

| | | |
|---|---|---|
| 2408945 | 7/1979 | France .................. 358/135 |
| 59-123383 | 7/1984 | Japan .................. 358/135 |
| 1191500 | 5/1970 | United Kingdom. |
| 1326386 | 8/1973 | United Kingdom. |
| 1362191 | 7/1974 | United Kingdom. |
| 1391434 | 4/1975 | United Kingdom. |
| 1525915 | 9/1978 | United Kingdom. |

OTHER PUBLICATIONS

Kerns H. Powers paper describing Wide-Aspect Angle Television, HDTV, 13.5 MHz Transmission given at SMPTE 123rd Technical Conf., Los Angeles, Oct. 25-30, 1981 published in SMPTE Journal Dec. 1982.

(List continued on next page.)

Primary Examiner—Raymond F. Cardillo
Assistant Examiner—Wayne R. Young
Attorney, Agent, or Firm—P. J. Rasmussen; P. M. Emanuel; R. G. Coalter

[57] ABSTRACT

A wide-aspect-ratio HDTV signal having 1600 luminance pixels/32 $\mu$S line and 980 lines/frame is data reduced by deleting odd pixels of each line of TV field #1 and even pixels of each line of TV field #2 to produce 800 pixels per line, and is further data compressed by a form of differential-pulse-code modulation. The DPCM organizes the pixels into groups of five, and for each group transmits or records one reference pixel at full N-bits. The pixels to the right and left of the reference pixel are compared therewith to produce difference signals of M bits, where M<N. The remaining two pixels of each group are compared with reference pixels from the lines above and below to form M-bit difference signals. The difference signals are transmitted. The DPCM coding reduces the 800 pixels/line to the equivalent of 480 pixels/line. The color portion of the wide-aspect-ratio HDTV is similarly coded to produce the equivalent of 240 pixel/line. The 480 luminance samples and 240 color samples are added to form 720 samples/line, or 1440 samples/64 $\mu$sec which can be accommodated by a CCIR-standard-601 signal processing system.

10 Claims, 22 Drawing Figures

OTHER PUBLICATIONS

Article High Definition Television Studies on Compatible Basis with Present Standards by Broder Wendland, published in SMPTE Television Technology in the 80's.

Article Questions on the Orientation of Research in HDTV in the 80's by Joseph Polansky, published in SMPTE in Television Technology in the 80's.

"A Digital Standards-Converter for Television Using Intra-Frame Line Interpolation Techniques" by Kinuhate et al., published in International Conference on Communications, Jun. 1974, IEEE.

Delta Modulation or DPCM as described in Conditional Vertical Subsampling—A Technique to Assist in the Coding of Television Signals" by Pease, Bell System Technical Journal, vol. 51, No. 4, Apr. 1972.

"Television Standards Converter Using Digital Technique", published in The Radio and Electronic Engineer, vol. 43, No. 3, Mar. 1973.

"Developments in Standards Conversion" by Clarke et al., read at International Broadcasting Convention, Sep. 1978 in London.

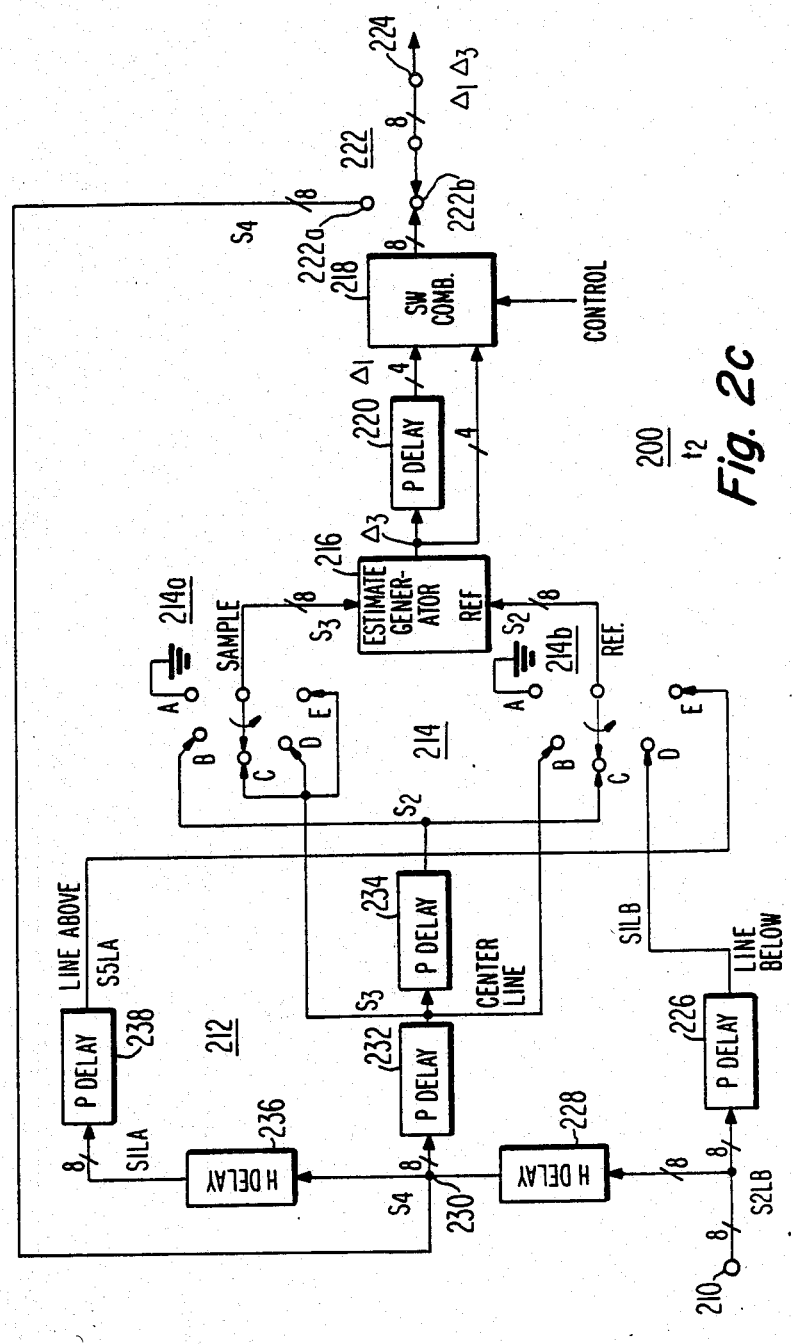

| NO. OF INPUT DIFFERENCE LEVELS ASSOCIATED WITH OUTPUT | RANGE OF DIFFERENCE SIGNAL AS A DECIMAL NUMBER | | REFERENCE PIXEL VALUE (DECIMAL) | | | | | | | |
|---|---|---|---|---|---|---|---|---|---|---|
| | | | 240-213 A | B 212-185 | 184-157 C | D 156-129 | 128-101 E | F 100-73 | 72-45 G | 44-16 H |
| 28 | −197 TO −224 | Δ=1 | | | | | | | | |
| 28 | −169 | 196 | Δ=2 | 1 | | | | | | |
| 28 | −141 | 168 | Δ=3 | 2 | 1 | | | | | |
| 28 | −113 | −140 | Δ=4 | 3 | 2 | 1 | | | | |
| 28 | −85 | −112 | Δ=5 | 4 | 3 | 2 | 1 | | | |
| 28 | −57 | −84 | Δ=6 | 5 | 4 | 3 | 2 | 1 | | |
| 28 | −29 | −56 | 7 | 6 | 5 | 4 | 3 | 2 | 1 | |
| 15 | −14 | −28 | 8 | 7 | 6 | 5 | 4 | 3 | 2 | 1 |
| 9 | −5 | −13 | 9 | 8 | 7 | 6 | 5 | 4 | 3 | 2 |
| 3 | −2 | −4 | 10 | 9 | 8 | 7 | 6 | 5 | 4 | 3 |
| 1 | −1 | | 11 | 10 | 9 | 8 | 7 | 6 | 5 | 4 |
| 1 | 0 | | 12 | 11 | 10 | 9 | 8 | 7 | 6 | 5 |
| 1 | +1 | | 13 | 12 | 11 | 10 | 9 | 8 | 7 | 6 |
| 3 | +2 | +4 | 14 | 13 | 12 | 11 | 10 | 9 | 8 | 7 |
| 9 | +5 | +13 | 15 | 14 | 13 | 12 | 11 | 10 | 9 | 8 |
| 15 | +14 | +28 | 16 | 15 | 14 | 13 | 12 | 11 | 10 | 9 |
| 28 | +29 | +56 | | 16 | 15 | 14 | 13 | 12 | 11 | 10 |
| 28 | +57 | +84 | | | 16 | 15 | 14 | 13 | 12 | 11 |
| 28 | +85 | +112 | | | | 16 | 15 | 14 | 13 | 12 |
| 28 | +113 | +140 | | | | | 16 | 15 | 14 | 13 |
| 28 | +141 | +168 | | | | | | 16 | 15 | 14 |
| 28 | +169 | +196 | | | | | | | 16 | 15 |
| 28 | +197 | +224 | | | | | | | | 16 |

*Fig. 8*

DIFFERENTIAL PCM VIDEO TRANSMISSION SYSTEM EMPLOYING HORIZONTALLY OFFSET FIVE PIXEL GROUPS AND DELTA SIGNALS HAVING PLURAL NON-LINEAR ENCODING FUNCTIONS

BACKGROUND OF THE INVENTION

This invention relates to digital television data links pursuant to CCIR 601 standard and particularly to a means by which signals representative of a high-definition, wide-aspect-angle image may be transmitted over a transmission system having characteristics in accordance with CCIR standard 601.

Standard 601 promulgated by the CCIR (International Radio Consultative Committee) defines a 2-channel component (as opposed to composite) digital television system with a 13.5 MHz channel rate in which each 63.5 $\mu$S horizontal line includes 720 samples or pixels in each channel, for a total of 1440 pixels per line. According to the standard, the 720 pixels of one channel are allocated to luminance information, and 360 of the pixels in the other channel are allocated to R-Y, with the remaining 360 pixels allocated to B-Y.

The above standard has been in preparation for several years, and it is expected that digital data processors and videotape recorders pursuant to the standard will become available in the near future.

There has been a recent surge of interest in television systems having high definition (highdef or HDTV) and aspect ratios greater than 4:3 (wide angle) which are compatible with conventional standard-definition (standef) 4:3 receivers. While special processing is required to produce wide-angle highdef signals compatible with conventional receivers, as described in U.S. Pat. No. 4,429,327 issued Jan. 31, 1984 to Oakley et al. and in U.S. patent application Ser. No. 350,088 filed Feb. 2, 1982, which issued Nov. 5, 1985, as U.S. Pat. No. 4,551,754 to W. H. Meise et al. there is need for processing such signals in the television studio with modern equipment. The most up-to-date equipment expected to be available shortly is digital equipment pursuant to CCIR standard 601.

There are two major television standards in use in the world; those having 625 lines-per-field at a 50 Hz field rate (625/50), and those having 525 lines-per-field at a 60 Hz field rate (525/60). In a 525-lines-per-frame television picture, 21 television lines (TVL) of each of two fields are used for blanking and are therefore not available for active picture information, with the result that there are 483 active lines, representing pixels in the vertical direction. Assuming that it is desired to have equal vertical and horizontal definition, each pixel is "square", and a standef 4:3 (4 units horizontally, 3 units vertically) aspect ratio picture may be said to have 4/3 × 483 = 644 pixels in the horizontal direction. Similarly, a wide-angle or wide-aspect-ratio standef picture having a 5:3 aspect ratio would then have 5/3 × 483 = 805 pixels in the horizontal direction. This may be rounded to 800 horizontal pixels if the assumption is made that for "square" pixels this corresponds to 480 active lines in the vertical direction, which in turn corresponds to or requires 22.5 TVL/field of blanking.

A high-definition television picture is usually considered to provide a 2:1 improvement in definition both horizontally and vertically. Beginning from a wide-angle standef picture of 800 horizontal pixels and 480 active lines per frame, a wide angle highdef system requires 1600 horizontal pixels and 960 lines per frame at 30 frames-per-second (actually 30/1.001) for the luminance component, and 800 pixels by 480 lines for the R-Y component ($C_R$) and for the B-Y component ($C_B$). It would be very desirable to be able to transmit such a high definition wide angle signal in a format which simulates the format of CCIR 601 so that the signal could be processed, transmitted and/or recorded by equipment pursuant to the standard.

SUMMARY OF THE INVENTION

Pixels of a digital television signal are grouped into sets of five horizontal pixels. One of the five is transmitted or recorded at full bit depth, which is 8 bits in a particular embodiment. The pixels to the right and to the left of the one transmitted are compared with the one transmitted to form a difference signal, which is transmitted with less than full bit depth (i.e. with 4 bits rather than 8). Fourth and fifth pixels of each set are compared with pixels of upper and lower horizontal lines which are transmitted at full bit depth to form further reduced-bit-depth difference signals. The reduced-bit-depth difference signals are transmitted or recorded and used to reconstruct the original signal. According to a further aspect of the invention, the difference signals are applied to a nonlinear coder before transmitting to improve the dynamic range.

DESCRIPTION OF THE DRAWING

FIGS. 2a-e illustrate a block diagram of an embodiment of an encoder or transmitter according to the invention in different operating states of an operating cycle;

FIGS. 7a-h and 8 illustrate in graphic and tabular forms, respectively, nonlinear transfer functions by which the dynamic range of the encoder of FIGS. 2 and 5 may be increased;

DESCRIPTION OF THE INVENTION

Figure 1:
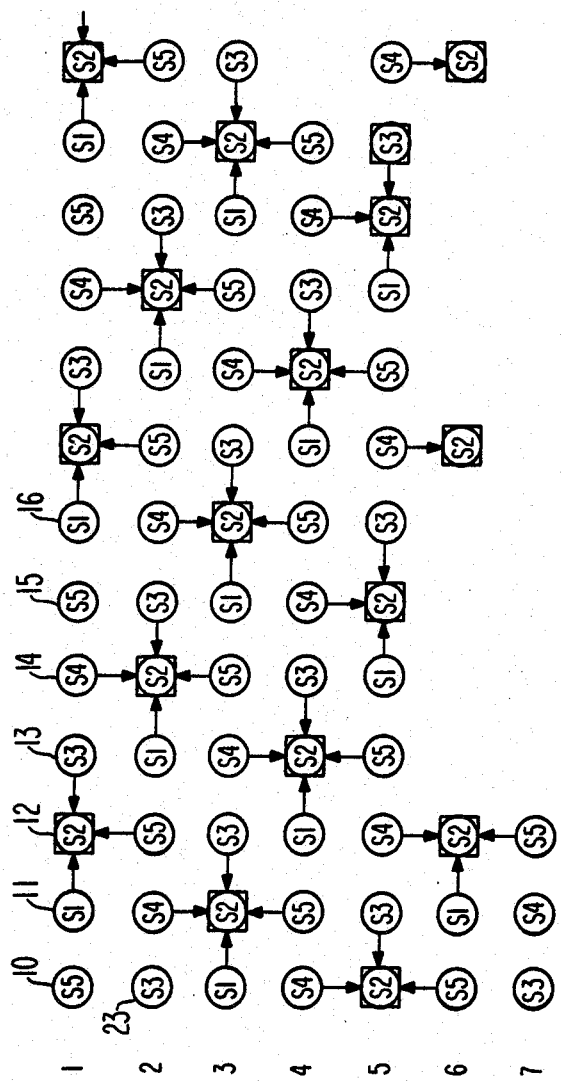
FIG. 1 illustrates a monochrome raster having 720 pixels per line and the pixel organization in accordance with the invention.

The upper left corner of a raster including lines 1-5 of the active portion of a field are illustrated in FIG. 1.

Line no. 1 begins at the left end with a pixel 10 illustrated as a circle labeled S5, and the next five pixels to the right of the first pixel are designated 11-15 and labeled S1, S2, S3, S4, and S5. The "S" designation denominates a sample. The next five pixels to the right of the second S5 pixel are similarly labeled S1-S5, and recurrent blocks of five pixels occur all the way to the end of the line. Raster line 2 of FIG. 1 also has pixels organized into groups of five, each group being designated S1-S5. However, the pixel groups of line 2 of FIG. 1 are offset by two pixels relative to the pixel groups of line 1. Thus pixel 23 at the left (starting) end of line 2 is labeled S3. The offset causes each pixel S1 of line 2 to be under a pixel S3 of line 1. Similarly, the pixels of lines 3, 4, and 5 of FIG. 1 are organized into recurrent groups of five pixels denominated as S1-S5, each group of which is offset with respect to the next adjacent group of pixels on the adjacent lines so that pixel S1 always lies under pixel S3, pixel S2 always lies between pixels S4 and S5, pixel S2 of a particular line always lies below pixel S4 of the next adjacent line above and above pixel S5 of next adjacent lower line or next adjacent line below. In FIG. 1, the pixels themselves are identified by circles. The pixels identified as S2 are enclosed in squares, to identify these pixels as pixels which are to be transmitted at full bit depth (also known as full bit width or full bit quantization). Each pixel is represented by an N-bit digital word. Pixels designated as S1, S3, S4 and S5 are not transmitted through the transmission system, or through the tape recorder channel, at full bit depth, but rather are transmitted in the form of a difference signal having fewer bits than N. For example, if the pixels are represented by 8-bit digital words, pixels S1 and S3 may be transmitted by first comparing the magnitude represented by the digital word representing S1 with the magnitude of the digital word representing S2, forming a difference by subtracting the S1 and S2 signals to form a 4-bit digital word representing the difference, and transmitting the difference signal. Since the digital word representing S2 is transmitted with full bit depth, a digital word which is a close approximation to S1 can be reconstructed at the output of the transmission system or recorder by adding to the digital word representing S2 the magnitude of the difference between S2 and S1. Similarly, S3 may be transmitted as a 4-bit digital word by comparing S3 with the next earlier pixel S2 which is transmitted at full bit depth, and the 4-bit representation of S3 may be reconstructed in a similar manner. Digital pixel S4 has no pixel to it left or to its right which is transmitted at full bit depth. However, because of the organization of the pixel groups, pixel S4 is immediately above a pixel S2 which is transmitted at full bith depth, and the comparison can be made between S4 and S2 to form a difference signal which is transmitted as a 4-bit signal representing pixel S4. In a similar manner, pixel S5 has no pixel transmitted at full bit depth to its left or to its right, so it is compared with a pixel S2 on the line above to form a difference signal which represents a pixel S5. In this manner, only one pixel out of five must be transmitted at full bit depth, and four pixels out of five may be represented by a difference signal transmitted at reduced bit depth. The above-described scheme of data reduction falls into the general catagory known as differential pulse-code modulation (DPCM), the general term for a variant of pulse-code modulation. In DPCM, the coded value transmitted for each sample represents the quantized difference between the present sample value and some combination of previous values. This is also sometimes known as delta modulation. If full bit depth is 8 bits, and if the difference signal has 4 bits (representing 16 possible levels) the four 4-bit pixels S1, S3-S5 require 16 bits for transmission, and when 8 bits from the full bit depth pixel S2 are added, only 24 bits are required to represent the signal, which if transmitted at full bit depth for all pixels would require 40 bits. Thus the data rate through the channel is increased by $40/24 = 1.66$, which also may be viewed as a reduction of data (data compression) of the signal to $24/40 = 0.60$. At the edges of the raster, certain pixels, such as pixels 10 and 23, which ordinarily would be transmitted by comparison with pixels lying off the active raster may be transmitted with respect to an S2 pixel at block level or zero-value. These pixels are in the overscan portion of the display and are not visible.

Figure 2A:
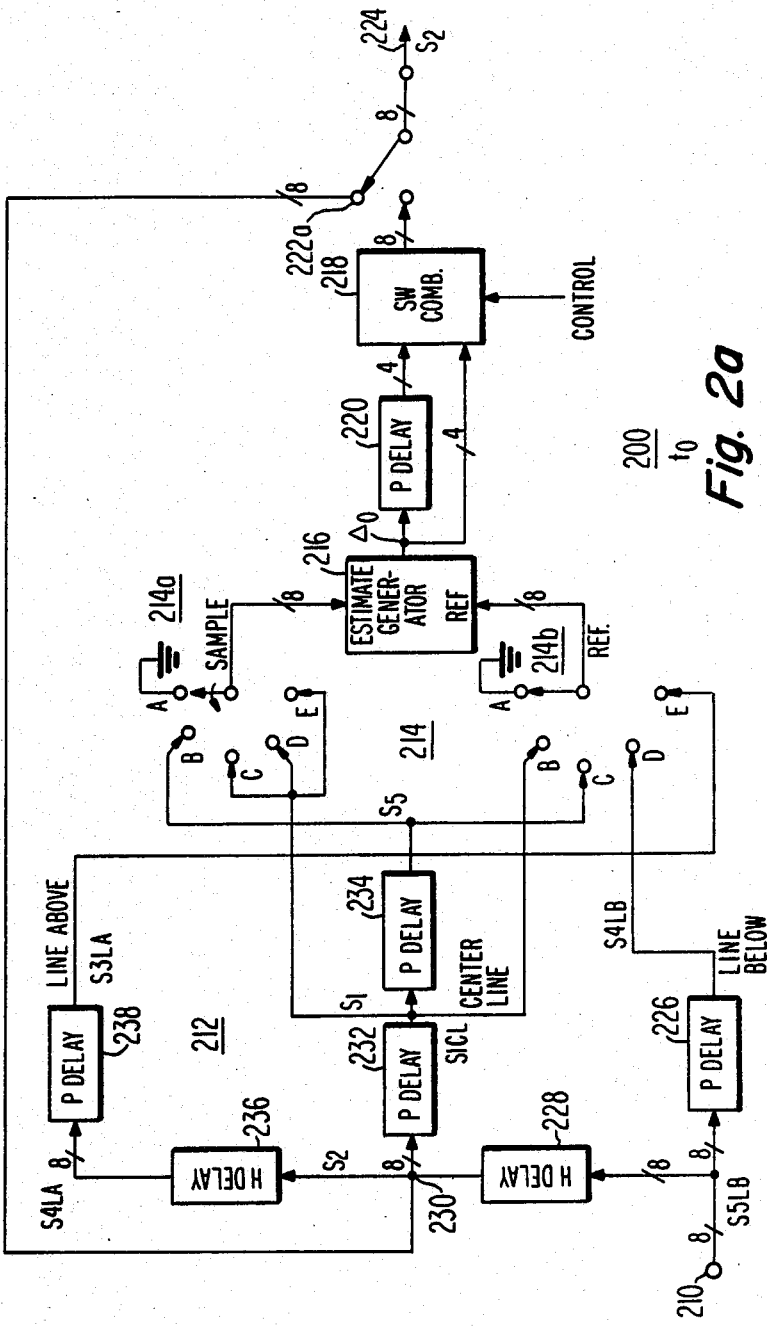

FIGS. 2a-2e represent different operating conditions of a data rate reducer or encoder 200 by which an 8-bit digital video signal at an input terminal 210 is processed to organize the pixel-representative words into groups of five, transmitting to an output terminal one of the five at full bit depth, and producing an additional four signals representative of the difference between the remaining four words and the reference word which is transmitted at full bit depth. In FIG. 2a, the input signals applied to input 8-bit terminal 210 are applied to a series of 8-bit delay lines designated together as 212 which produce various samples representing different times, which correspond to various pixels on a raster. These delayed samples are applied to a switching current designated generally as 214 including ganged rotary switch sections 214a and 214b, which are also 8-bit switches. The selected samples are applied from switches 214 to the reference and sample inputs of an estimate generator 216. Estimate generator 216 generates a signal (delta) representing the difference between the sample applied to the sample input and the reference signal. The difference signal has fewer bits than the full bit depth of the sample or reference signals. The difference or delta signal is applied to the input terminals of a combining circuit 218 directly and also by way of a delay circuit 220. Combining circuit 218 combines the two delta less-than-full-bit-depth signals applied to its input to form a combined signal having full bit depth, and applies the resulting full-bit-depth signal to a multiplex switch designated generally as 222. Switch 222 assumes the position illustrated in FIG. 2a during those intervals in which the full-bit-depth reference signal (S2) is to be transmitted and otherwise assumes the positions illustrated in FIGS. 2b-2e to couple combined delta signals to output terminal 224.

The digital video signal applied at input terminal 210 is applied to a pixel-length delay (one word or one clock cycle delay) to produce at the output of delay 226 the most recent sample or the youngest sample which is made available to switches of 214. Since a raster such as the raster of FIG. 1 is scanned from left to right and from top to bottom, this corresponds to a sample on the lowermost line of the lines being considered or the "line below" (LB).

The signal applied to input terminal 210 is also applied to a delay line 228 having a delay of one horizontal line, which delays the signal for the duration of one horizontal line to produce a sample representing one horizontal line above the "line below", which is a central or "center line", which appears at node 230. The central line signal applied to node 230 from delay 228 is applied directly to a terminal 222a of multiplex switch 222, and is also applied to a cascade of pixel delays 232 and 234. The signal appearing at the output of delay line 232 is older than the signal applied to its input by one pixel, and therefore represents a pixel to the left of the one currently appearing at node 230, but exactly above the pixel appearing at the output of delay 226. The signal at the output of further pixel delay 234 is still older than the signal at the output of delay 232, and therefore is one pixel to the left of the signal at the output of delay 232. Lastly, the one-horizontal-line delayed signal at node 230 is applied to the cascade of a further horizontal line delay 236 and a pixel delay 238 to produce a signal which is two horizontal lines and one pixel older than the signal currently applied to input terminal 210 and consequently corresponds to a pixel exactly two lines above the pixel at the output of delay 226. Consequently this is termed a "line above" (LA) pixel.

Switch section 214 samples the center line pixels appearing at the output of delay 232 and 234 for application to the sample input terminal of estimator 216. Similarly, signals for the reference input terminal of estimator 216 are selected by rotary switch portion 214b from the outputs of delays 232 and 234 and from the line above and the line below. In the position shown in FIG. 2a, a digital reference signal such as all-zeros is selected by both switch sections 214a and 214b, as illustrated by the symbolic ground connection. Thus, estimator 216 produces a signal $\Delta 0$ (delta-zero) representative of no difference and appplies it to the input of delay 220 and to an input of combiner 218. Combiner 218 generates combined signals under the control of a control signal, as described hereafter. Since multiplex switch 222 in the position shown is transmitting a full-bit depth signal designated S2 to the output terminal 224, the control signal applied to combiner 218 is selected to produce no output signal from the combiner.

At the instant $t_o$ illustrated in FIG. 2a the pixel at node 230 has been selected for transmission at full bit depth, and therefore the pixel at node 230 corresponds to pixel S2 as illustrated in the raster of FIG. 1. Consequently, the pixel at the output of delay 232, which is the next older pixel to pixel S2, is to the left of pixel S2 on the raster and is therefore called S1. Similarly, the pixel at the output of delay 234 is the next pixel to the left of pixel S1 on the center line and is therefore called pixel S5, which is a pixel from a previous by processed group of five pixels. At the same time $t_0$, the signal at the output of pixel delay 226 is the pixel immediately underneath pixel S1 of the center line. As illustrated in FIG. 1, the pixel directly below a pixel S1 is a pixel designated S4. The designation of S4 occurs because the selection of the pixel to be transmitted with full bit depth in each line (the S2 pixel) is always directly above an S5 pixel and directly below a S4 pixel. Thus, at the same instant that the output of delay 232 is an S1 pixel, the output of delay 226 is an S4 pixel on the line below the center line (S4 LB) and the output of delay 238 is an S3 pixel on the line above the center line (S3 LA).

It should be noted in order to avoid confusion that the labeling of a pixel in terms of S1–S5 changes for any particular pixel as it progresses through the delay lines. For example, and S1 pixel from the line which is currently the "line below" becomes an S3 pixel when delayed by exactly 1H to the "center line".

Figure 2B:
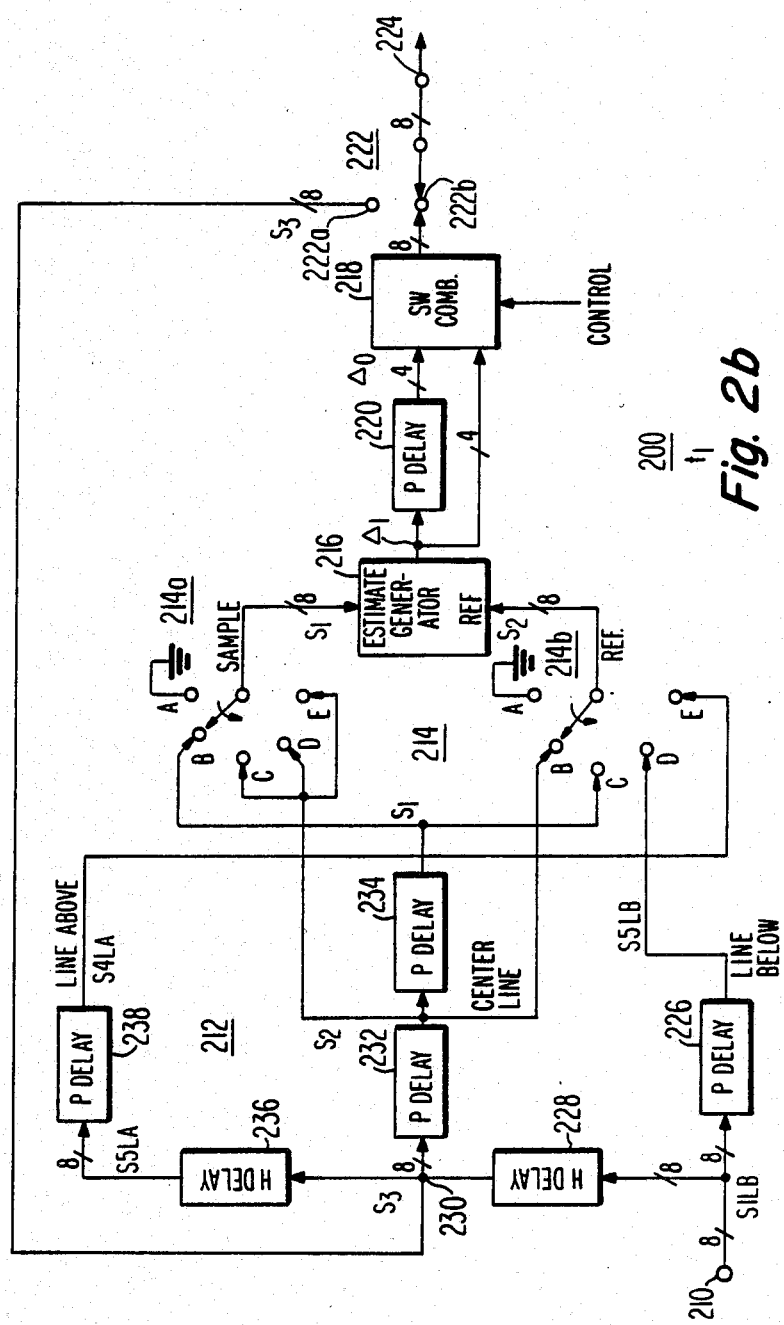

FIG. 2b illustrates the operating condition of data rate reducing circuit 200 for the next clock cycle time $t_1$ after the condition illustrated in FIG. 2a. At time $t_1$, the previous S1 output of delay line 232 has moved to the output of delay line 234. The output of delay line 232 is the next pixel to the right of S1, which is S2. Node 230 at the output of delay 228 has the next pixel newer than S2 on the center line, which is S3. The output of delay line 226 has as its output the pixel S5LB from the line directly below pixel S2, and the output of delay 238 bears pixel S4LA, the S4 pixel from the next line above the center line. The wipers of switch sections 214a and 214b couple to the sample and reference input terminals of estimator 216 the center line S1 and S2 pixels, respectively. The pixels from the lines above and below are not used for the estimate at this time. Estimator 216 compares the magnitude of the digital word representing the S1 pixel with the magnitude of the digital word representing the S2 pixel and produces from the comparison a 4-bit $\Delta_1$ signal representing the magnitude of the difference. (The subscript identifies the pixel of which the subscripted delta signal is representative). The $\Delta_1$ signal is applied to an input of combining circuit 218 and to a pixel delay 220. Since only one 4-bit difference signal is available at the input of combining circuit 218, the control input voltage is set to produce no combined 8-bit output. Switch 222 connects terminal 222b to output terminal 224 in readiness for the coupling of an output signal from combiner 318 to the output terminal.

FIG. 2c illustrates the condition of data rate reducing circuit 200 at a time $t_2$ after the next clock cycle following the condition illustrated in FIG. 2b. As illustrated in FIG. 2c, center line pixel S2 is coupled by the contact of switch section 214b to estimator 216, and center line pixel S3 is applied by way of switch section 214a to the sample input terminal of estimator 216. Estimator 216 produces from the comparison a $\Delta_3$ signal representing the difference between pixel S2 (previously transmitted at full bit depth) and sample S3. Signal $\Delta_3$ is applied to an input terminal of combiner 218 and to an input terminal of pixel delay 220. At time t2, the $\Delta_1$ signal applied at time t1 to the input of delay 220 exits, and therefore $\Delta_1$ is applied to the second input of combiner 218. The combiner control signal is selected at this time to cause combiner 218 to produce an 8-bit output representing a 4-bit $\Delta_1$ signal and a separate independent 4-bit $\Delta_3$ signal. These signals are coupled by way of switch terminal 222b to output terminal 224.

Figure 2D:
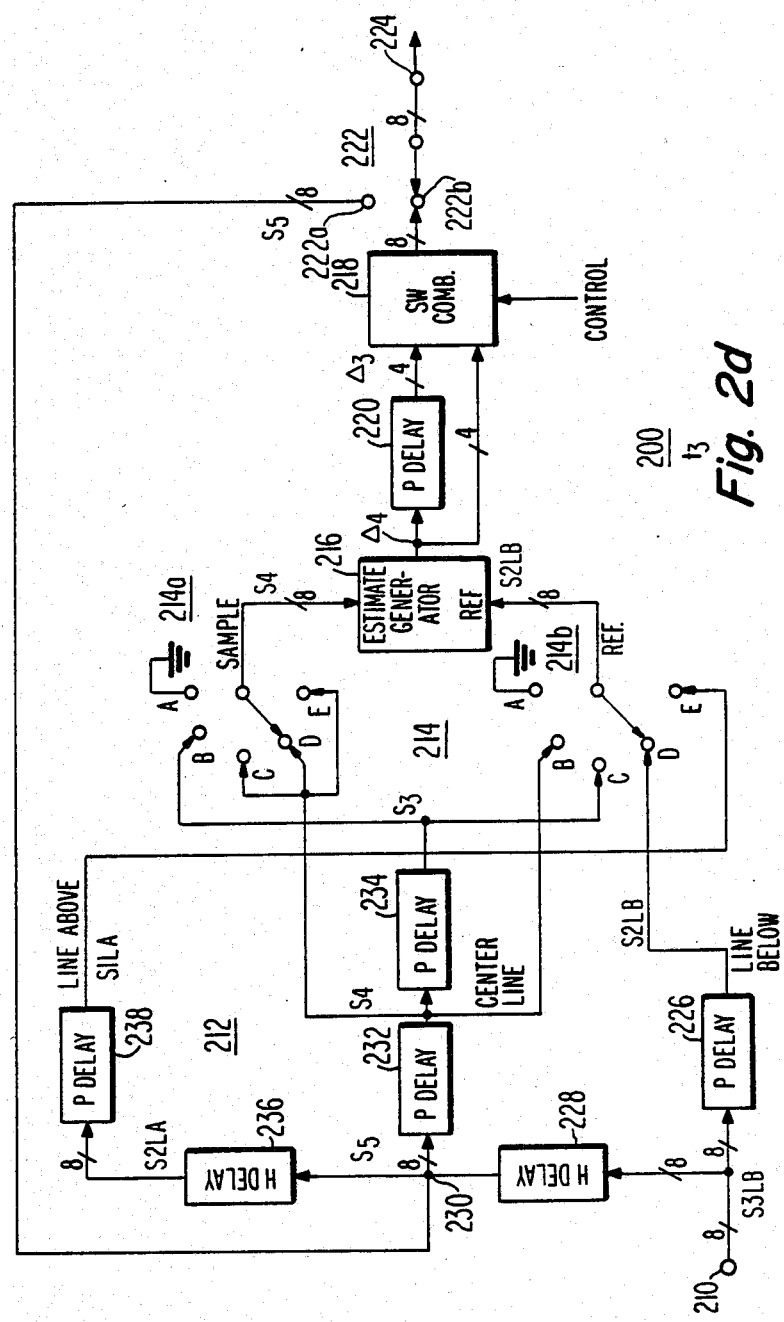

FIG. 2d illustrates the condition of data rate reducer 200 at a time t3, one clock cycle later than time t2, the time illustrated in FIG. 2c. At time t3, sample S4 at the output of delay 232 is coupled by switch portion 214a to the sample input of estimator 216. Simultaneously, pixel S2LB (pixel S2 from the line below) is coupled from the output of delay 226 to the reference input terminal of estimator 216. Estimator 216 generates a signal $\Delta_4$ representative of the difference between S4 and S2LB, and applies signal $\Delta_4$ to an input terminal of combiner 218. Simultaneously, signal $\Delta_3$ is applied from the output of delay 220 to a second input of combiner 218. The control input voltage to combiner 218 is selected to produce no output for this clock cycle, because the information available to the combiner is $\Delta_3$ and $\Delta_4$, and the $\Delta_3$ information has already been coupled through combiner 218 at time t2.

Figure 2E:
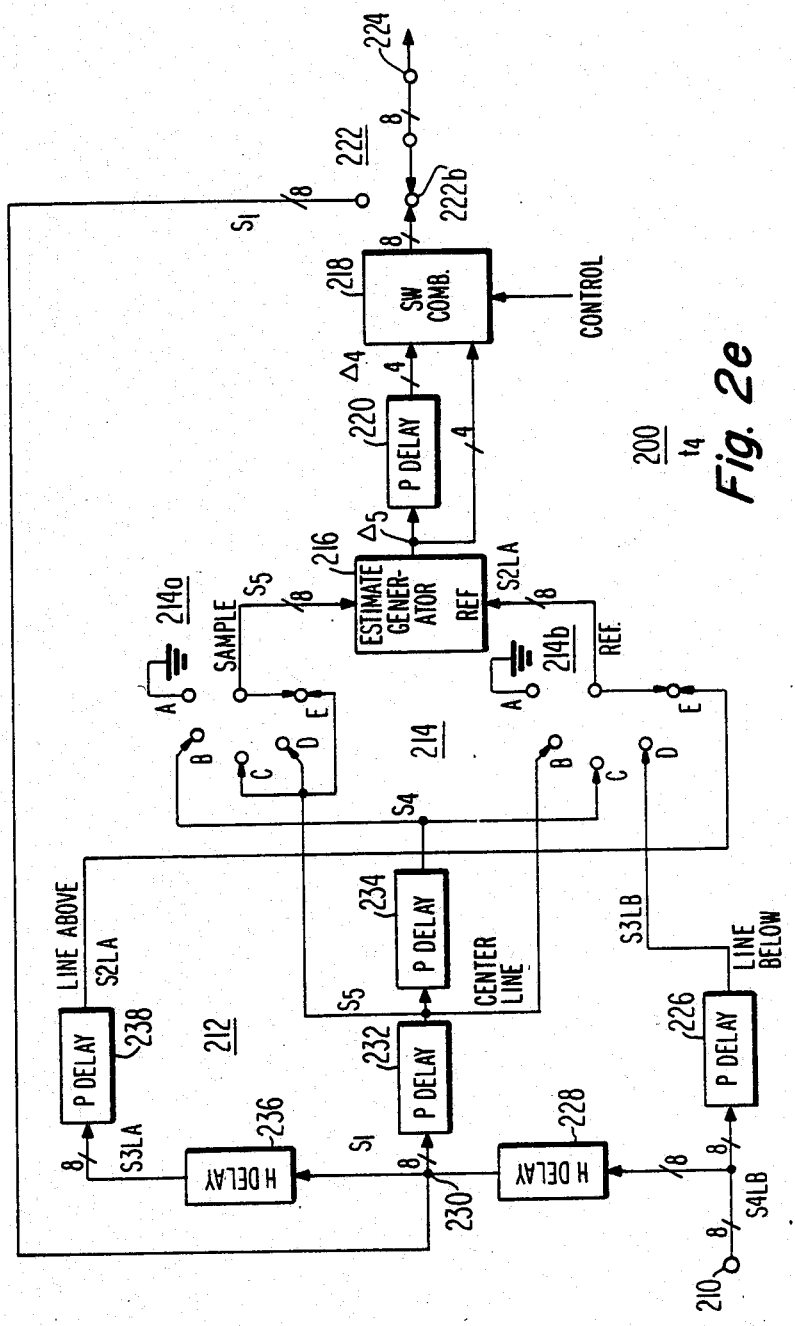

FIG. 2e illustrates the operating condition of data rate reducer 200 at a time t4 one clock cycle later than time t3. At time t4, switch portion 214a couples sample S5 from the output ot delay 232 to the sample input of estimator 216, and switch portion 214b couples pixel S2 from the line above S2LA from the output of delay 238 to the reference input terminal of estimator 216. Estimator 216 geneates a signal $\Delta_5$ representing the difference between word or pixel S5 and S2LA. Signal $\Delta_5$ is applied from the output of estimator 216 to an input of combiner 218 together with signal $\Delta_4$ from the output of delay 220. The control voltage applied to the control input of combiner 218 is set at this time to produce an 8 bit combined output signal representing independently the 4 bits of $\Delta_4$ and the 4 bits of $\Delta_5$, which are transmitted by way of switch terminal 222b to output terminal 224. This completes a cycle of operation over five words or pixels.

It will be recognized that the condition of data reduction circuit 200 at time t4 corresponds to the condition immediately preceding that at time t0 as illustrated in FIG. 2a. Thus, the cycle begins again with a new time t0 for another group of five pixels of the horizontal line being processed. It will be recognized that there are 720 pixel-representative words per horizontal line in a transmission system operating pursuant to CCIR standard 601. Thus, there are 144 groups, of five pixels each, in each horizontal line at output terminal 224. In addition, each horizontal line duration of 63.5 microseconds according to CCIR 601 includes a time portion of approximately 10 microseconds attributable to synchronizing signal and blanking signal use, for reasons described in detail in U.S. Pat. No. 4,438,452 issued Mar. 20, 1984 in the name of Powers. Thus, there may be an interval in which no active video is applied to input terminal 210.

Figure 3:
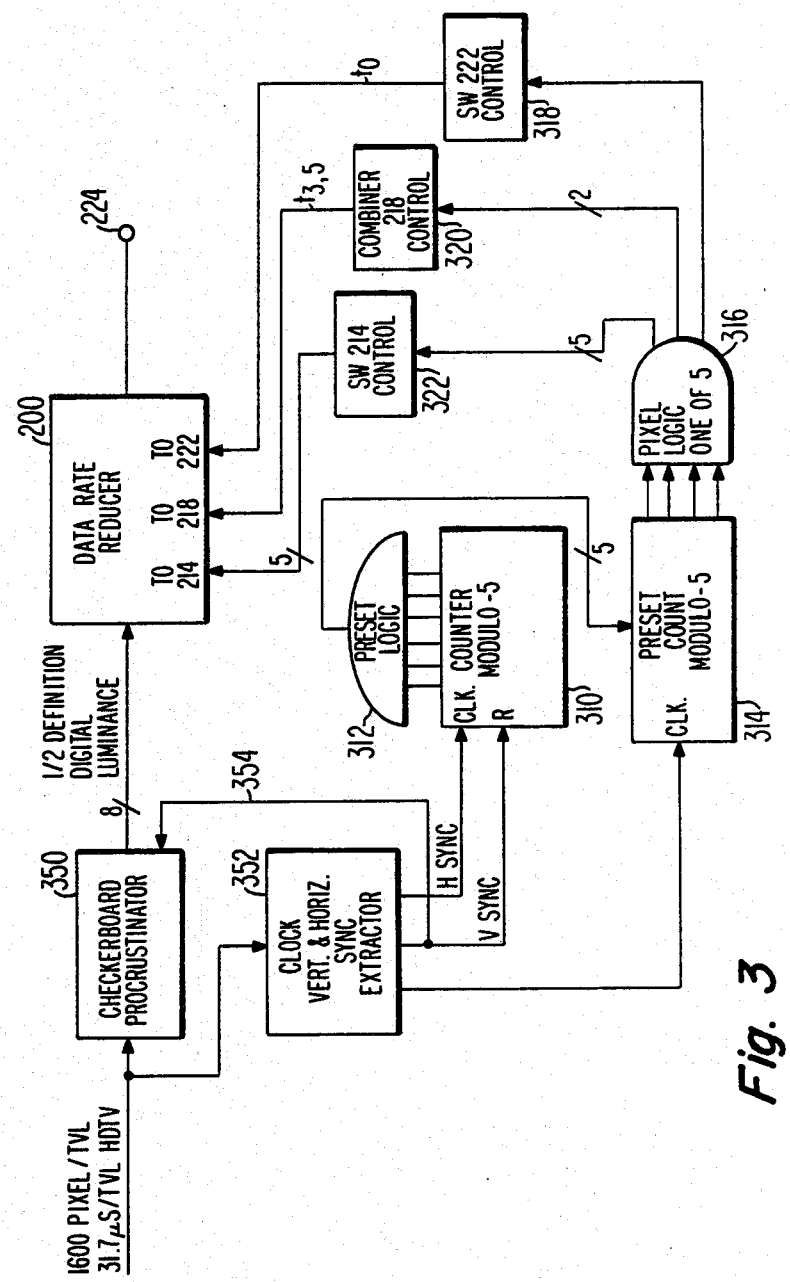
FIG. 3 is a block diagram of a timing and control circuit for the arrangement of FIG. 2.

The synchronizing signals accompanying the applied input signal may be used in well-known fashion to initialize a clock for presetting the condition of switches 214 and 222 at the beginning of the active portion of each line and for counting modulo five (in groups of five) for maintaining the switch operation in synchronism with the desired cositing of pixels transmitted with pixels whose values are transmitted in the form of delta signals across the length of each line. FIG. 3 illustrates details of timing and control circuits for data rate reducer 200.

In FIG. 3, source of HDTV luminance signals organized into 1600 pixels/31.77 $\mu$S TVL are applied to a checkerbord procrustinator 350 and, if clock and sync are not carried on separate lines, to a clock and sync signal separator 352. Procrustinator 350 forms a checkerboard pattern of pixels transmitted to data rate reducer 200 by deleting alternate pixels from each line in a pattern which alternates from even to odd fields under the control of a V or field pulse applied over a conductor 354, as described in more detail below. In FIG. 3 vertical and horizontal synchronizing signals derived from digital words accompanying the digital luminance signals from the source of signal are applied to the clock and input resets, respectively, of a modulo-five line-rate counter 310 which establishes the condition at the beginning of each horizontal line on a recurrent basis. Referring to FIG. 1, it will be seen that the first bit (the left bit) of each line follows a recurrent sequence S5, S3, S1, S4, S2; S5, S3, S1, S4, S2; . . . Counter 310 is reset by vertical sync at the beginning of each field and counts modulo five. A preset logic circuit illustrated as 312 is coupled to the stages of counter 310 for producing a one-of-five signal which is applied to a modulo-five counter 314 to preset its condition at the beginning of each line. Counter 314 receives clock signals at its clock input terminals and counts modulo five from the preset condition present at the beginnng of each line. The modulo five count corresponds to the organization of the pixels into recurrent groups of five along each line. A logic 316 coupled to the stages of counter 314 responds to the counter state to produce control signals which are applied to drive circuits 318, 320 and 322 for operating switch 222 to contact terminal 222a at time t0 of each recurrent five-clock-count, to operate combiner 218 at times t2 and t4 of each recurrent cycle, and to step switches 214 to the preset condition at the beginning of each line and step through one position for each succeeding clock pulse of that horizontal line.

As so far described, the arrangement of FIG. 3 controls data rate reducer 200 to reduce the data rate of the HDTV signal thruput by the ratio 24/40. The number of pixels which can be passed through one channel of a recording or transmission system according to CCIR 601 using data rate reducer 200 is 720 times 40/24, or 1200 pixels for each 63.5 microsecond interval. A high definition-television signal as described above has 1600 horizontal pixels for each 31.25 $\mu$S interval, or 3200 pixels per 63.5 $\mu$S interval. Clearly, the full data rate cannot be accommodated even by use of the data rate reducer. The data rates are, therefore, further adjusted by a combination of deletion of alternate pixels of the incoming HDTV signal and by utilizing some of the excessive resolution available in the color channels of a system according to CCIR 601.

Figure 4:
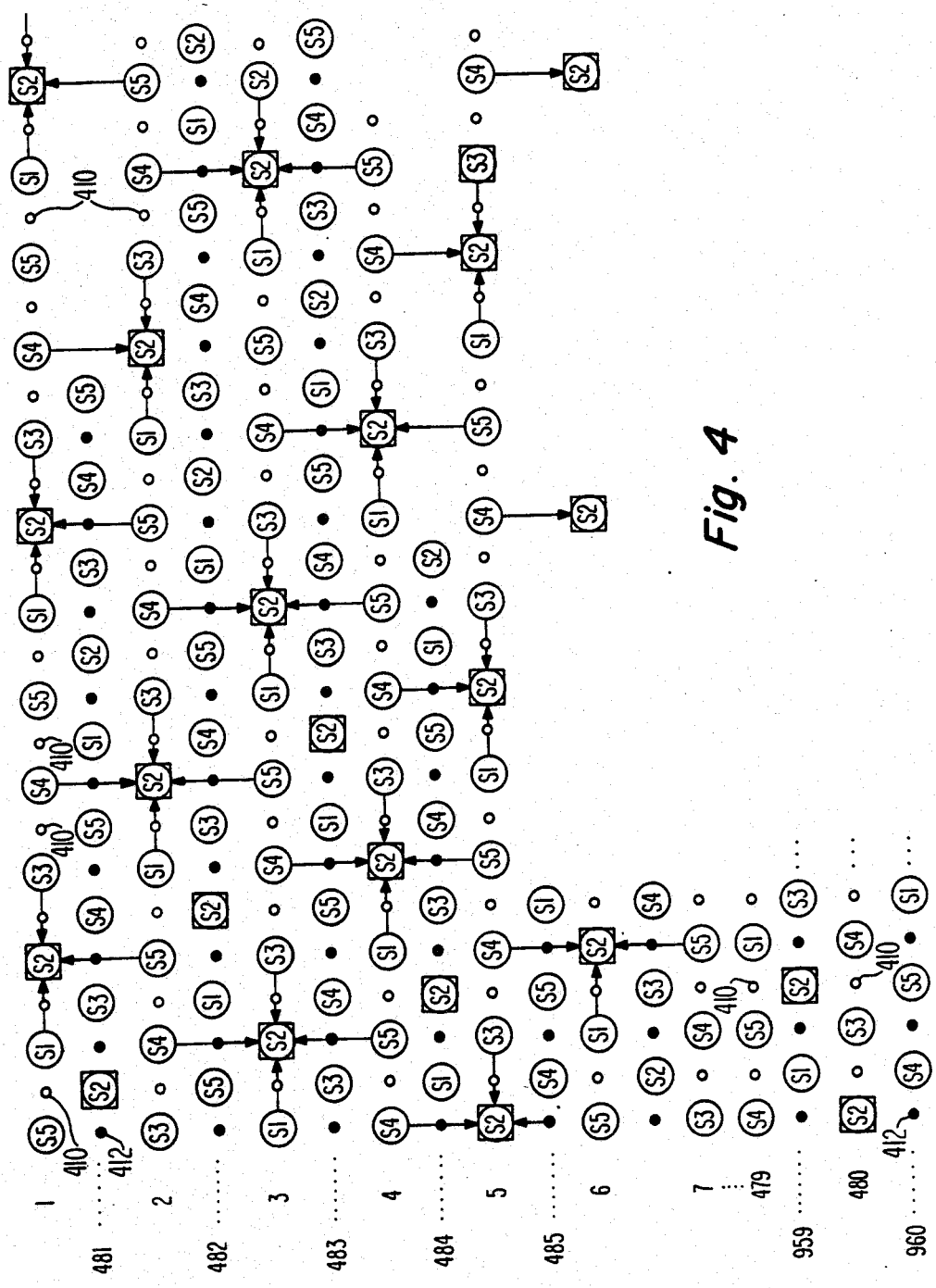
FIG. 4 illustrates pixels of a High Definition TV (HDTV) raster and their relationship to the pixels of the raster of FIG. 1.

FIG. 4 is a depiction of the left side of a raster frame with HDTV pixel spacing. As illustrated, each horizontal line 1, 2, 3 . . . 479, 480 of odd field 1 includes recurrent groups of pixels S1-S5 organized as described in conjunction with FIGS. 1 and 2, the S2 pixels of which are transmitted through data rate reducer 200 with full bith depth, and also includes further pixels of lines 481-960 of an even field 2. The lines 481-960 of field 2 are interlaced with lines 1-480. Each HDTV line contains 1600 pixels, alternate ones of which are not transmitted. The pixels not transmitted from field 1 are illustrated as open dots 410, and the pixels from field 2 which are not transmitted are identified by closed dots 412. Each 31.77 $\mu$S-line illustrated in raster 400 contains 800 pixels to be transmitted, or 1600 pixels per 63.55 $\mu$S horizontal line interval. Thus, deletion of alternate pixels of the HDTV signal reduces the 3200 pixels in each 63.55 $\mu$S interval to 1600 pixels. This is accomplished without loss of detail resolution in still portions of the image, because the selection of the samples being transmitted in full-bit-depth or reduced-bit-depth form is such that alternate fields transmit samples located at vertical and horizontal lines corresponding to those not transmitted on the adjacent fields. This may result in a field-rate flicker of fine detail and/or loss of diagonal resolution.

Alternate pixels (even pixels) 410 of odd fields (fields 1, 3, 5, . . .) are deleted from the signal applied to data rate reducer 200 by checkerboard procrustinator circuit 350 illustrated in FIG. 3 and odd-numbered pixels 412 of even fields (fields 2, 4, 6 . . . ) are also deleted under control of a field pulse. Procrustinator 350 receives 31.5 microsecond ($\mu$S) horizontal lines of HDTV video and deletes every other horizontal pixel sample, and sample-and-holds the pixels S1-S5 which are to be retained, so that the sampled-and-held signals occupy both the times of the samples to be maintained and also the times of the samples being deleted. Thus, the samples to be retained are stretched to include the interval of the samples deleted. For 1600 pixels occurring during the active 26.7

μS line, each pixel has a duration of 16.7 nsec, which is stretched to 33.4 nsec by the sample-and-hold in procrustinator 350. Procrustinator 350 may include a clock-driven divide-by-two circuit controlling a transmission gate and a sample-and-hold circuit, all as known in the art.

Figure 5:
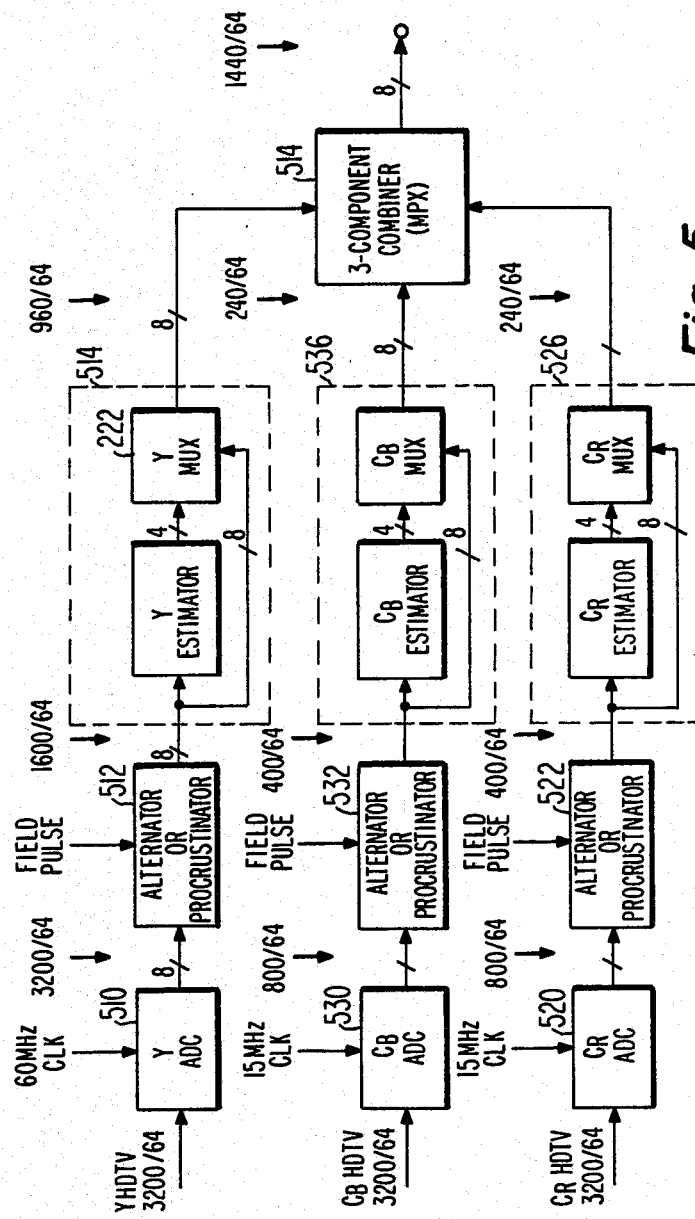
FIG. 5 is a block diagram of a portion of an arrangement for receiving analog HDTV signals and for processing them to produce digital signals compatible with CCIR standard 601.

FIG. 5 illustrates a system for accepting analog high definition TV signals in the form of luminance (Y), R-Y ($C_r$) and B-Y ($C_b$) signals having a 31.5 KHz line rate and the analog equivalent of 1600 pixels per 31.7 μS horizontal lines with 26.7 μS active interval. The Y signal is applied to the input terminal of an analog-to-digital converter (ADC) 510 which also receives a 60 MHz (actually 59.94 MHz for the duration mentioned above) sample clock signal from a source (not shown). ADC 510 produces an 8-bit luminance-representative signal which is applied to a pixel alternator 512 which selects alternate pixels for transmission as described in conjunction with FIG. 4. The selected pixels are applied to a data rate reducer 514 which operates as described in conjunction with FIG. 2a.

Similarly, the $C_r$ is applied to an ADC 520 which produces 8-bit signals at ½ of the 60 MHz clock rate of luminance, which is 30 MHz. Consequently, the $C_r$ and $C_B$ signals at the outputs of ADC 520 and 530, respectively, occur at ½ the rate of the luminance samples, which is a rate of 800 samples for each 32 μS line. The $C_r$ signal is applied to a pixel alternator 522 which discards every other sample in the horizontal direction, thereby leaving 400 samples per line, which are applied to a data rate reducer 526 similar to that illustrated in FIG. 2a. In a similar fashion, the $C_b$ signal is applied from ADC 530, through pixel alternator 532 and data rate reducer 536 to produce data-rate reduced $C_b$ signals for application to a three-component combiner or multiplexer 514. Data rate reducers 526 and 536 operate in a manner similar to that of 200 of FIGS. 2a–e. The 400 $C_R$ or the 400 $C_B$ samples per 31.7 μS line are each reduced to $$400 \times 24/40 = 240 \text{ 8-bit pixels.}$$

40.

Combiner 514 receives chrominance-representative signals in the form of 240 8-bit words in each 31.7 μS line (480 8-bit words in each 63.55 μS line) for each of $C_r$ and $C_b$. Combiner 514 selects $C_R$ samples on "odd" TV lines and $C_B$ samples on "even" TV lines, thus performing the chroma line alternation associated with HDTV systems. This reduces the vertical color resolution of the resulting signal, but the vertical color resolution as established by the 960 lines per frame exceeds that necessary for a good color picture. Thus, the total number of chrominance-representative words is 480 in each 63.55 microsecond interval. Consequently, the entire CCIR standard chrominance capacity of 720 words per 63.55 microsecond line is not used, and words from the luminance channel which are in excess of the 720 samples-per-line capacity can be inserted into the chrominance channel. The 960 words produced by data rate reducer 514 exceeds the 720-word capacity of the luminance portion of the CCIR-601 luminance channel by 240 words, which is exactly the number of words which can be added to the chrominance portion of the CCIR-601 channel.

Combiner or multiplexer 514 is a time-division multiplexer using conventional techniques for receiving 960 8-bit (Y) words per line and 240 ($C_r$)+240 ($C_B$) 8-bit chroma words in each 63.55 μS, and for combining them in known fashion for transmission in a serial format such as $$Y_1 \; Y_2 \; C_{R1} \; Y_3 \; Y_4 \; C_{R2} \; Y_5 \; Y_6 C_{R3} \; Y_7 \; Y_8 \; C_{R4} \ldots$$

on one line followed by a corresponding sequence including $C_B$ for the next line, or in any other desired format, including a parallel format $$Y_1 \; Y_2 \; Y_3 \; Y_5 \; Y_6 \; Y_7 \; Y_o \; Y_{10} \; Y_{11}$$

$$C_{R1} \; C_{B2} \; Y_4 \; C_{R2} \; C_{B2} \; Y_8 \; C_{R3} \; C_{B3} \; Y_{12}$$

which may be processed through a CCIR-601 signal processor or video tape recorder. Generally, the CCIR-standard signal processor does not care what the bits represent, so long as the data rate corresponds and suitable handshaking requirements are met. Thus, a wide-aspect-angle HDTV signal maintaining almost full vertical and horizontal definition for still images may be reduced to a data rate which can be passed through a CCIR 601 channel.

Figure 6:
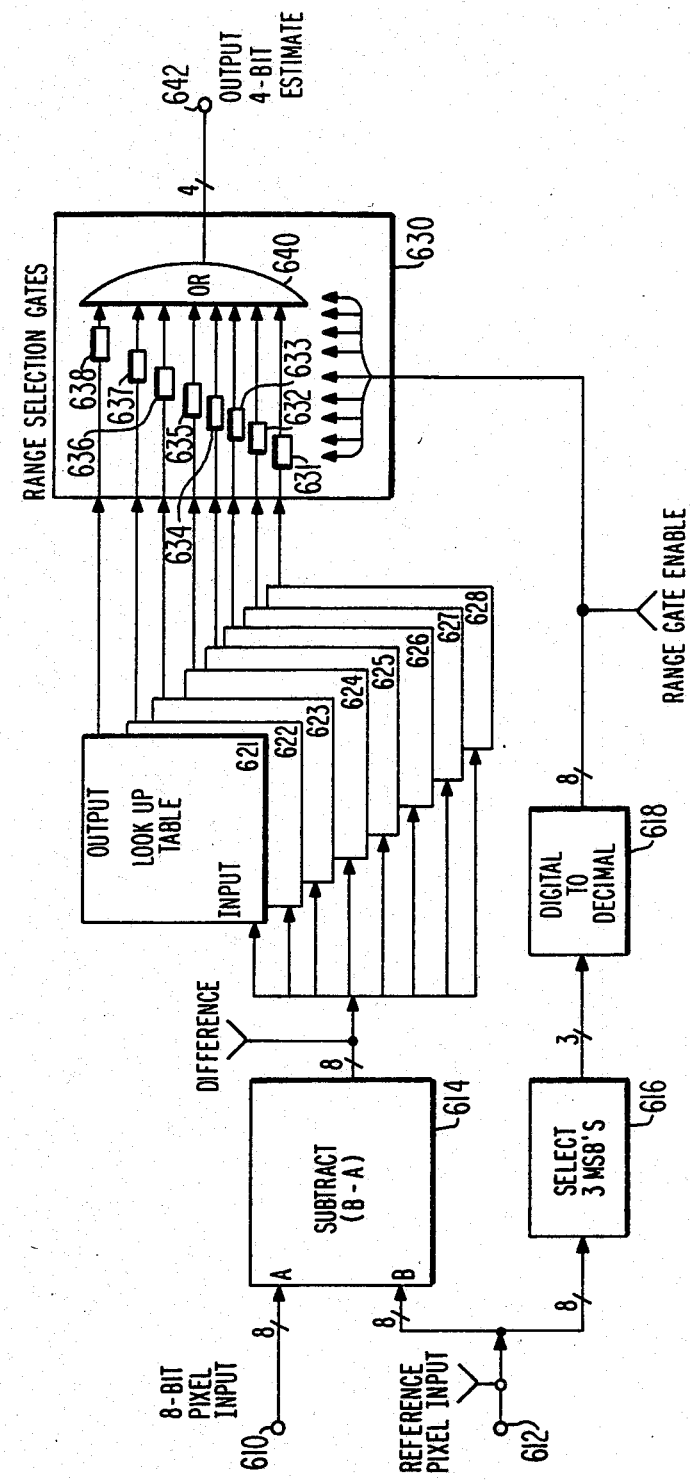
FIG. 6 is a block diagram of an adaptive estimator which may be used in the arrangement of FIGS. 2 or 5.
Figure 7A:
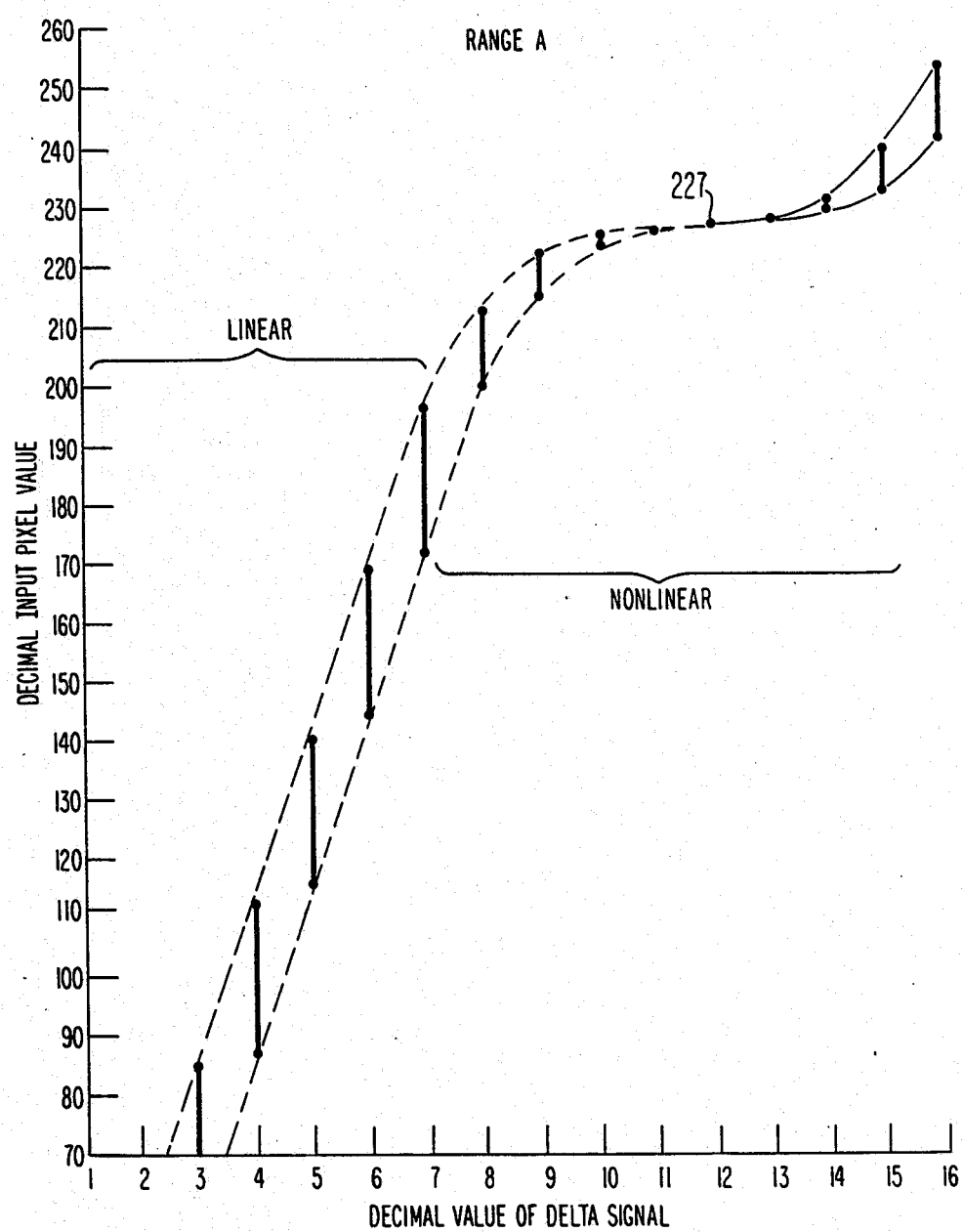
Figure 7B:
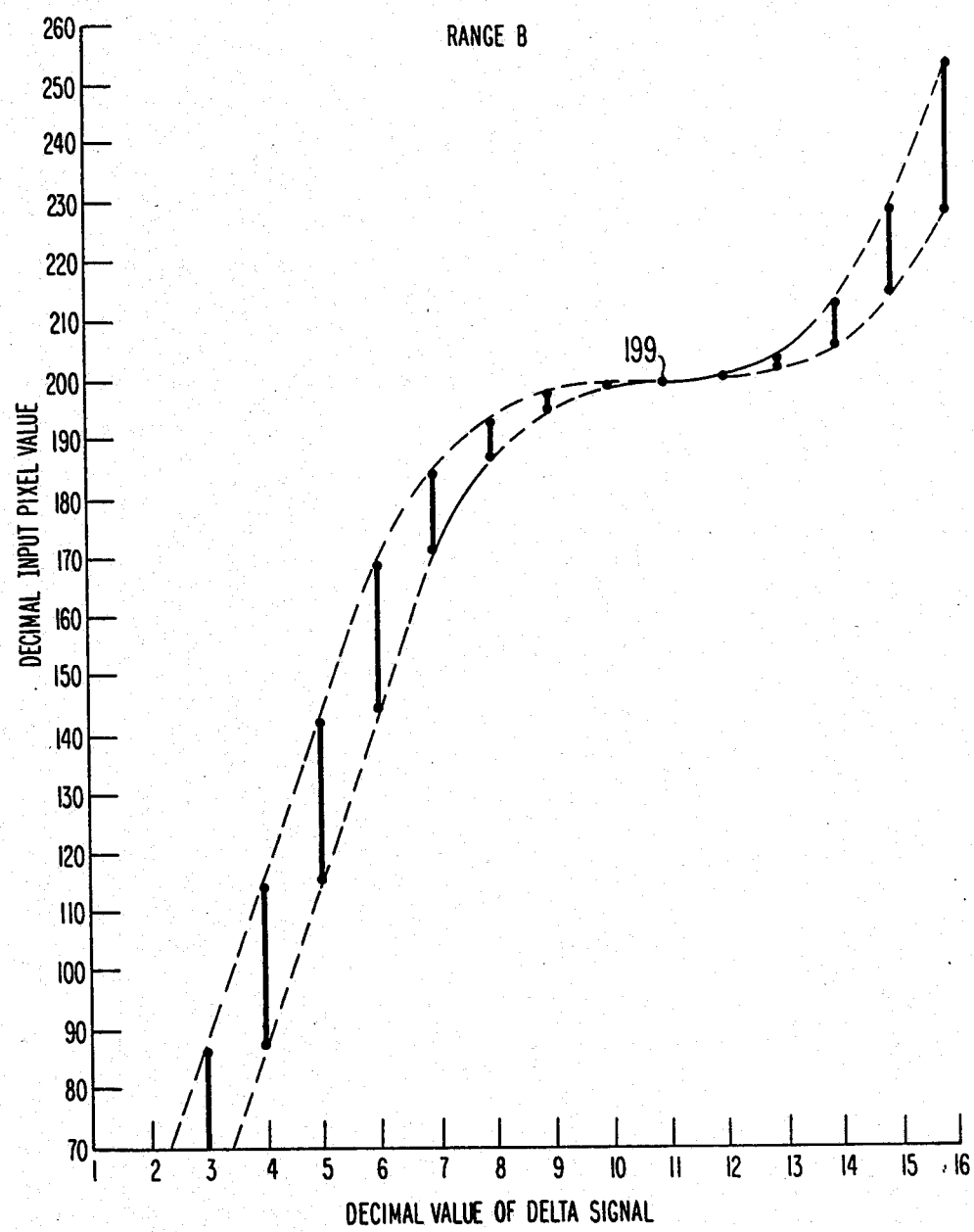
Figure 7C:
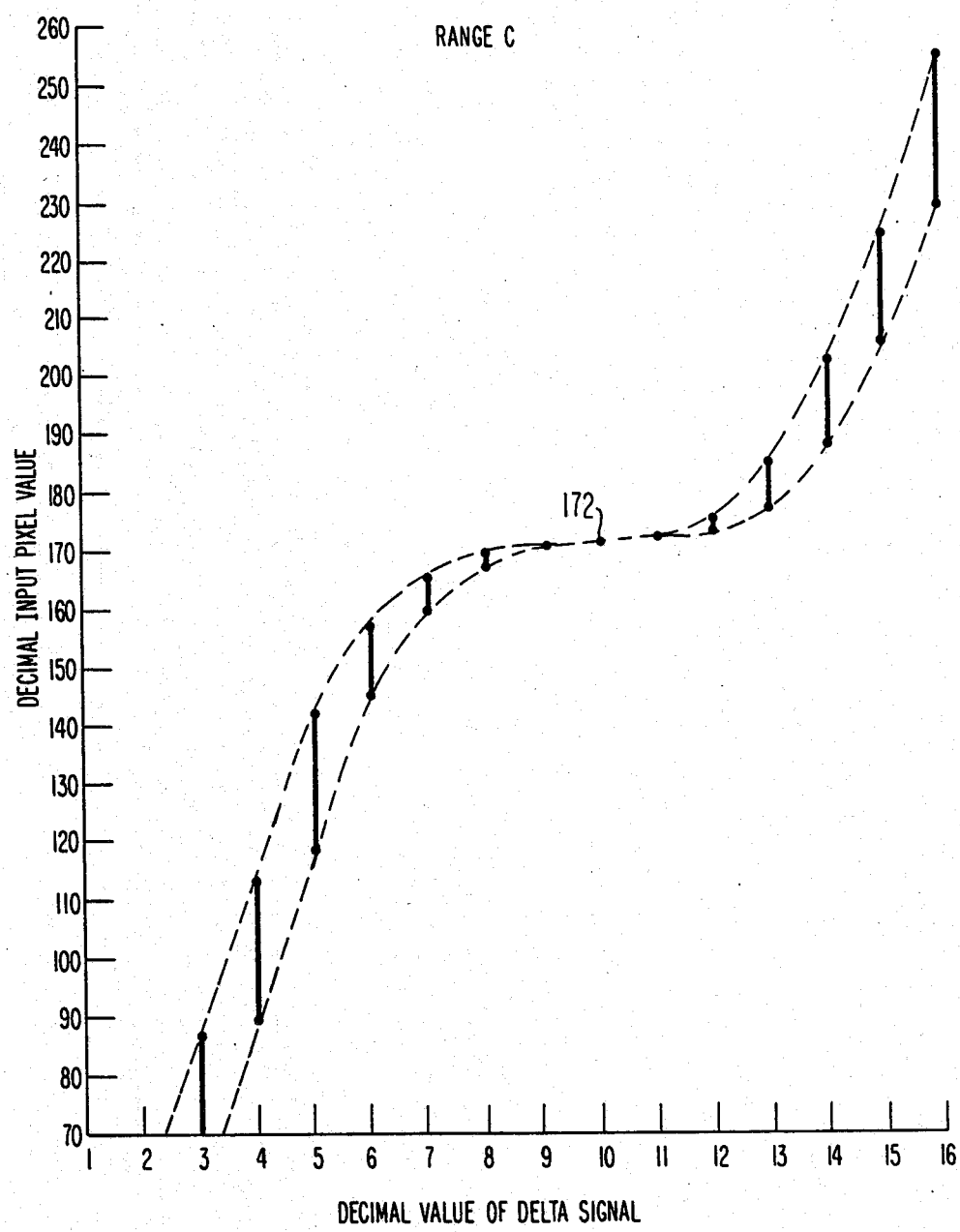
Figure 7D:
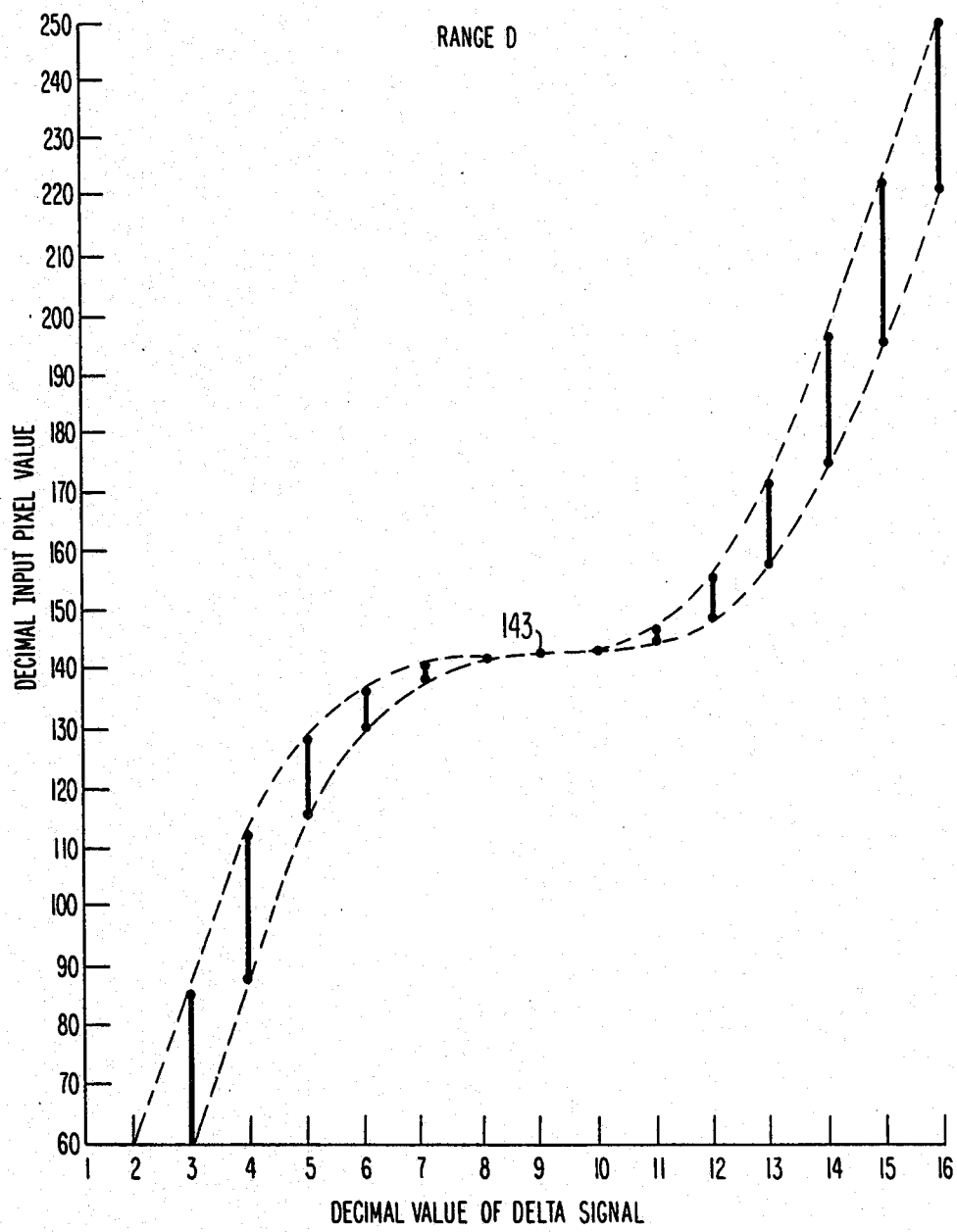
Figure 7E:
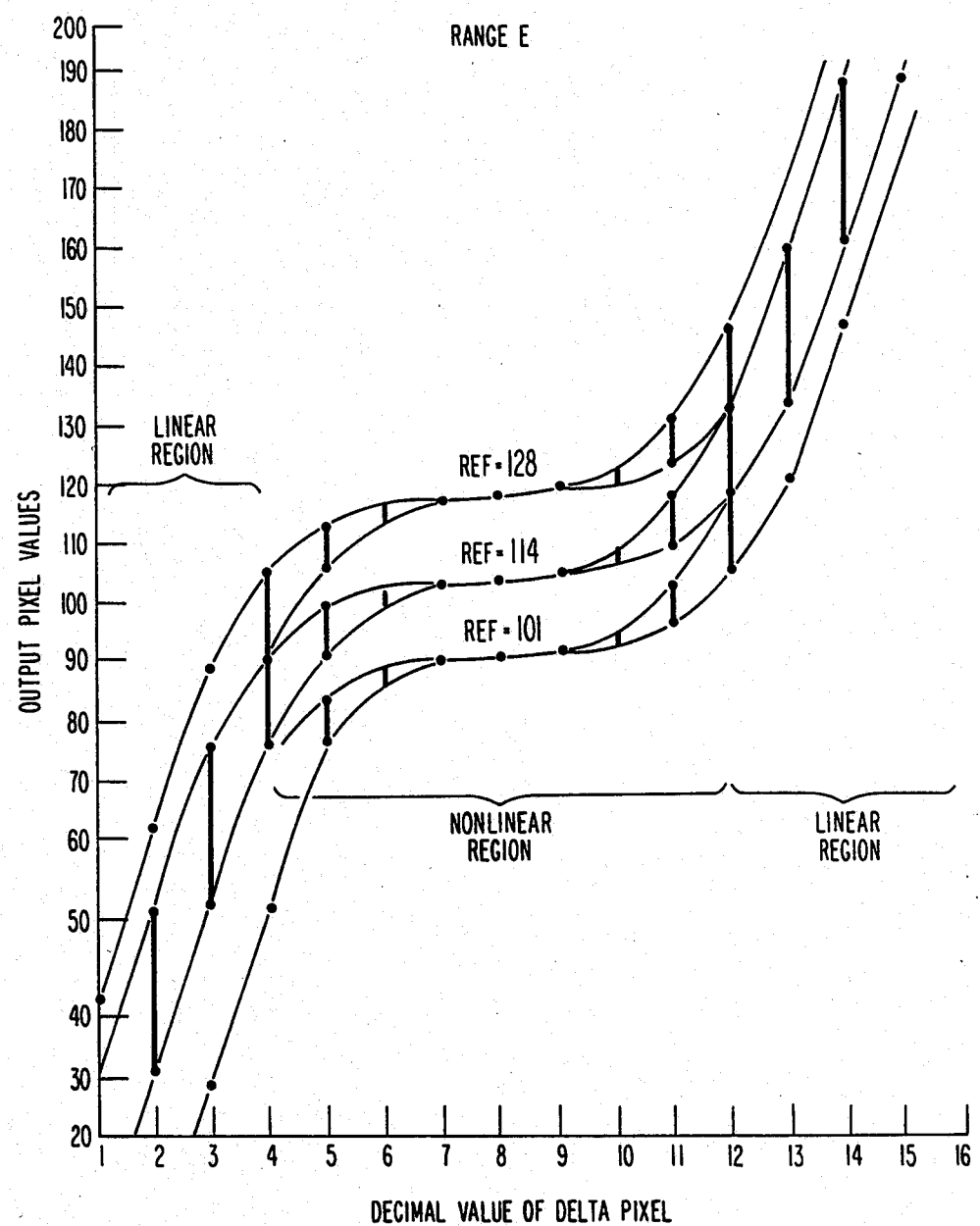
Figure 7F:
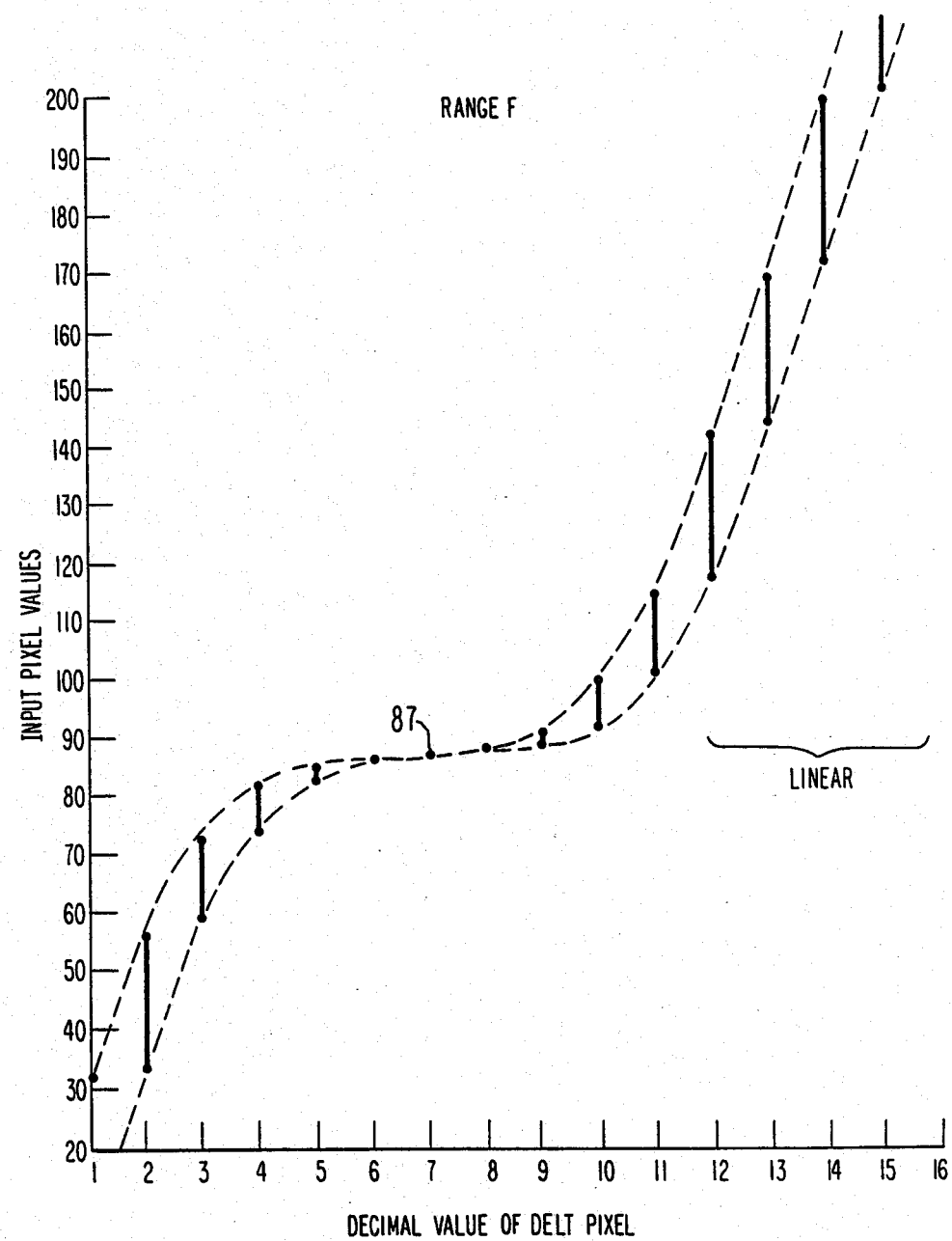
Figure 7G:
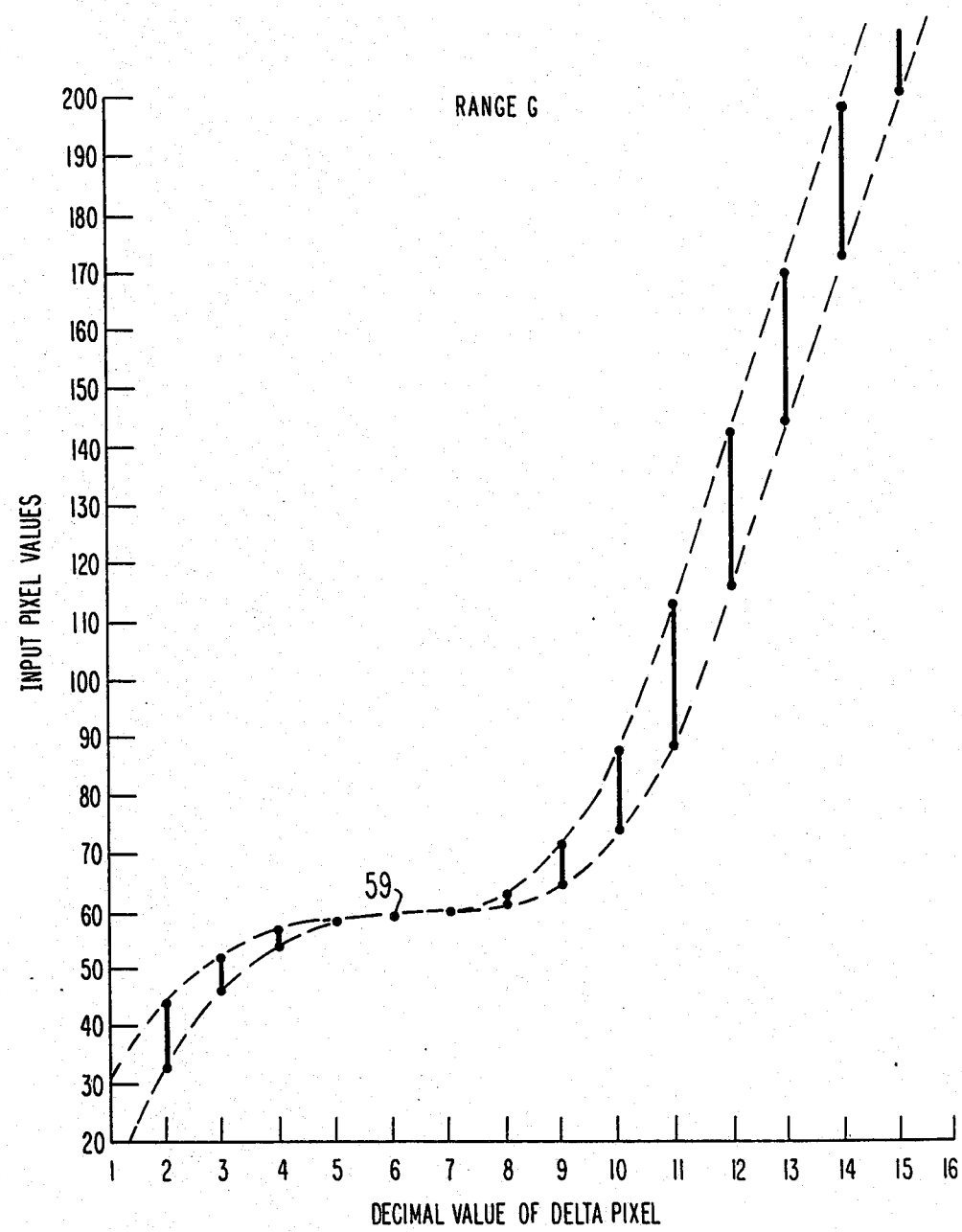
Figure 7H:
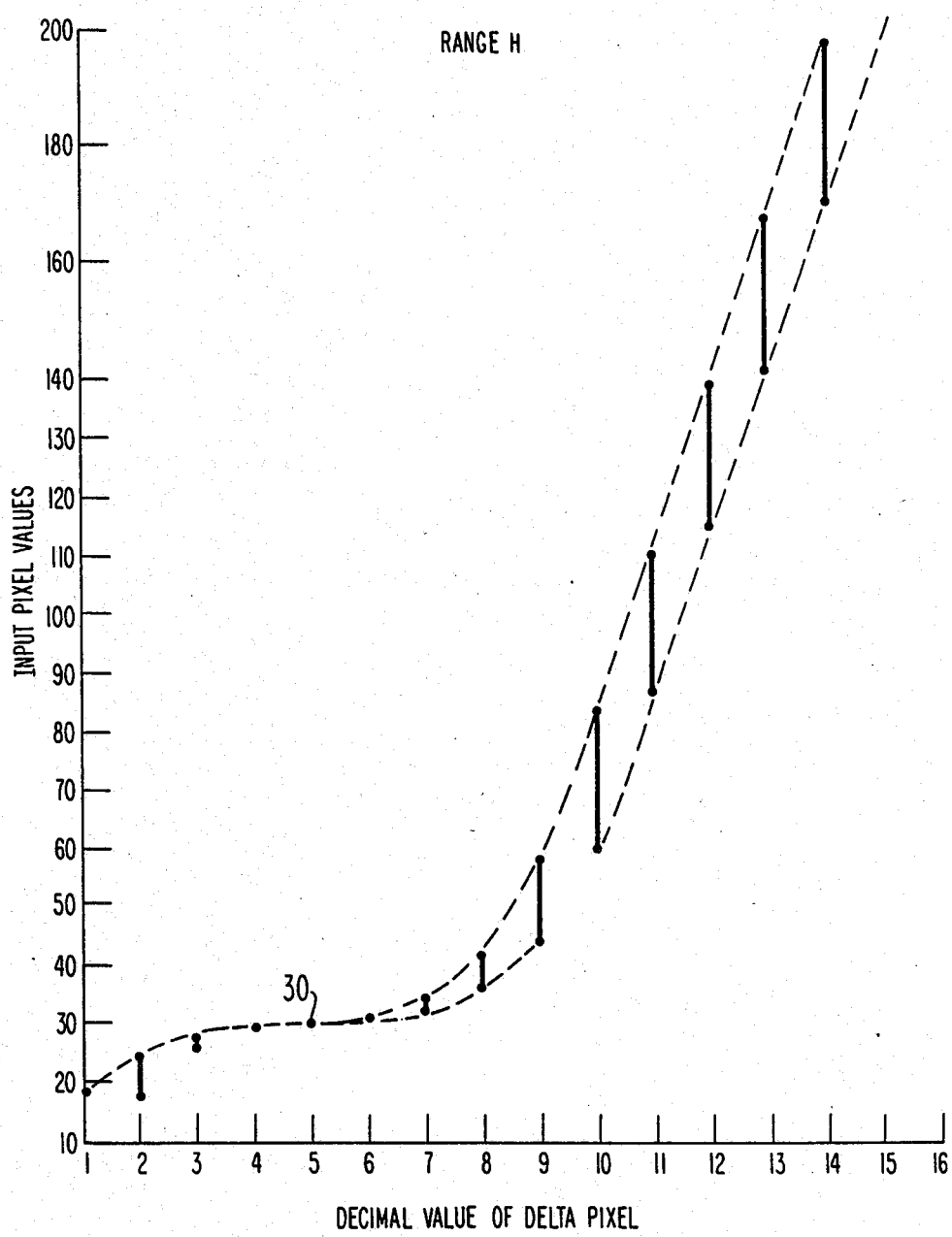

FIG. 6 illustrates details of estimator 216. In FIG. 6, 8 bit pixel inputs are applied to an input terminal 610 and reference pixels are applied to a reference pixel input 612. The reference pixels are applied from terminal 612 to an input terminal of a subtractor 614 for having subtracted from the value of a reference pixel the value of the 8 bit input pixel (pin). The 8-bit difference signal is applied in parallel to the 8-bit address inputs of each of 8 look-up tables or ROMS 621–628, each of which has a 4-bit output from each memory location. The 4-bit outputs are applied by way of 4-bit transmission gates 631–638 to the inputs of an 8-input 4-bit-per-input OR gate 640 of range selection gate 630.

Each look-up table 621–628 is preprogrammed with one of eight data sets. The characteristics of these data sets are illustrated in FIGS. 7a–h and tabulated in FIG. 8. In general, the 8-bit difference signal generated by subtractor 614 may represent a magnitude ranging from zero to 256. CCIR 601 specifies that luminance is represented by quantization levels from 16 to 220, and color-difference signals are represented by 224 quantization levels. Clearly, a 4-bit word capable of representing 16 states cannot represent all 256 (actually 220, 224) possible values of the difference signal. Consequently, one of the 16 possible states of a 4-bit delta signal must be selected for each of 256 values which the difference signal at the output of subtractor 614 may take. The simplest scheme would assign to each quantum increment of the 4-bit delta signal 16 possible states of the difference signal from subtractor 614. Thus, each quantizing level increment of the delta signal would represent the same different increment. However, this may not be the best utilization of the available states. In accordance with an aspect of the invention, ROMS 621–628 are programmed with a nonlinear transfer function which is adaptively selected depending upon the magnitude of the difference signal from subtractor 614 and also depending upon the magnitude of the reference pixel. In general, it is readily understood that if the 8-bit input pixel and the reference pixel are close together, it is desirable to have the 4-bit delta signal represent a small increment, so that small changes in signal level from pixel to pixel are accurately reproduced. However, for those situations in which there is a large change in amplitude from one pixel to the next, the eye is less sensitive to the exact magnitude of the difference, and therefore some error may be allowable. For example, if a particular pixel represents zero amplitude level and the next pixel represents an amplitude level of 256, it is easily understood that a transition from zero to some level such as 250 over a distance of one pixel will be virtually indistinguishable from a transition from zero to 256.

The particular look-up table output signal which selection gate 630 selects for application to output terminal 642 establishes the particular nonlinear transfer function. The output of one of look-up tables 621–628 is selected under the control of the magnitude of the reference pixel. The three most significant bits (MSB) of the reference pixels are selected by discarding bits of lesser significance in a circuit 616, and the three MSB are applied to a one-of-M or digital-to-decimal circuit 618 which decodes the MSB to select one of the eight lines (conductors) applied to gates 631–638 for enabling one of the gates thereby allowing the output of that look-up table to pass to OR gate 640 and to output terminal 642. In effect, this adaptively selects or changes the transfer function by which the 4-bit delta signal at output terminal 642 is generated.

In operation, reconstitutor 916 receives as reference an 8-bit S2 pixel such as 10000000, representing a value such as decimal 128, followed by an S1 pin word 1000 (decimal 8). This indicates (FIG. 8) that the difference is zero, and reconstitutor 916 produces as a replacement for 1000 an output word 10000000 representing 128. For $S_2=128$ and $S_1=3$ (corresponding to an increment $-57$ to $-84$), reconstitutor 916 creates an 8-bit word representing $128-$ (the average of 57 and 84), or $128-44=84$.

The adaptive transfer function is most easily understood by considering a few examples. As a first example, consider a reference 8-bit pixel representing an amplitude 128, and a 8-bit input pixel at terminal 610 also representing an amplitude of 128. The 8-bit difference signal at the output of subtractor 614 represents a value of zero. Referring to the reference pixel magnitude headings of the table of FIG. 8, it is seen that a reference pixel value of 128 lies at the upper extreme of range E. For a magnitude difference of zero, the delta signal will have a digital value corresponding to decimal 8, as described above. As a second example consider a reference pixel 10000000 representing decimal 128, hence Table E is again used. For a pin value of 150, the 8-bit difference signal at the output of subtractor 614 represents decimal $+22$, which lies in the range of difference signal $+14$ to 30 28, for which the decimal value of the 4-bit delta signal is established from FIG. 8 as decimal 12 (1100). That is to say, that the digital word 1100 will be transmitted any time the reference pixel has a value 128 and the 8-bit digital word applied to input terminal 610 lies in the range between 142 (difference equal to $+14$) and 156 (difference $+28$). This can be viewed as transmitting the average of $+14$ and $+28$, when the difference is anywhere in that range. Put another way, a 4-bit delta signal of 1100 will be transmitted any time the difference signal from subtractor 614 is in the range $+14$ $+28$ and the reference pixel is in the range 101–128.

Figure 9:
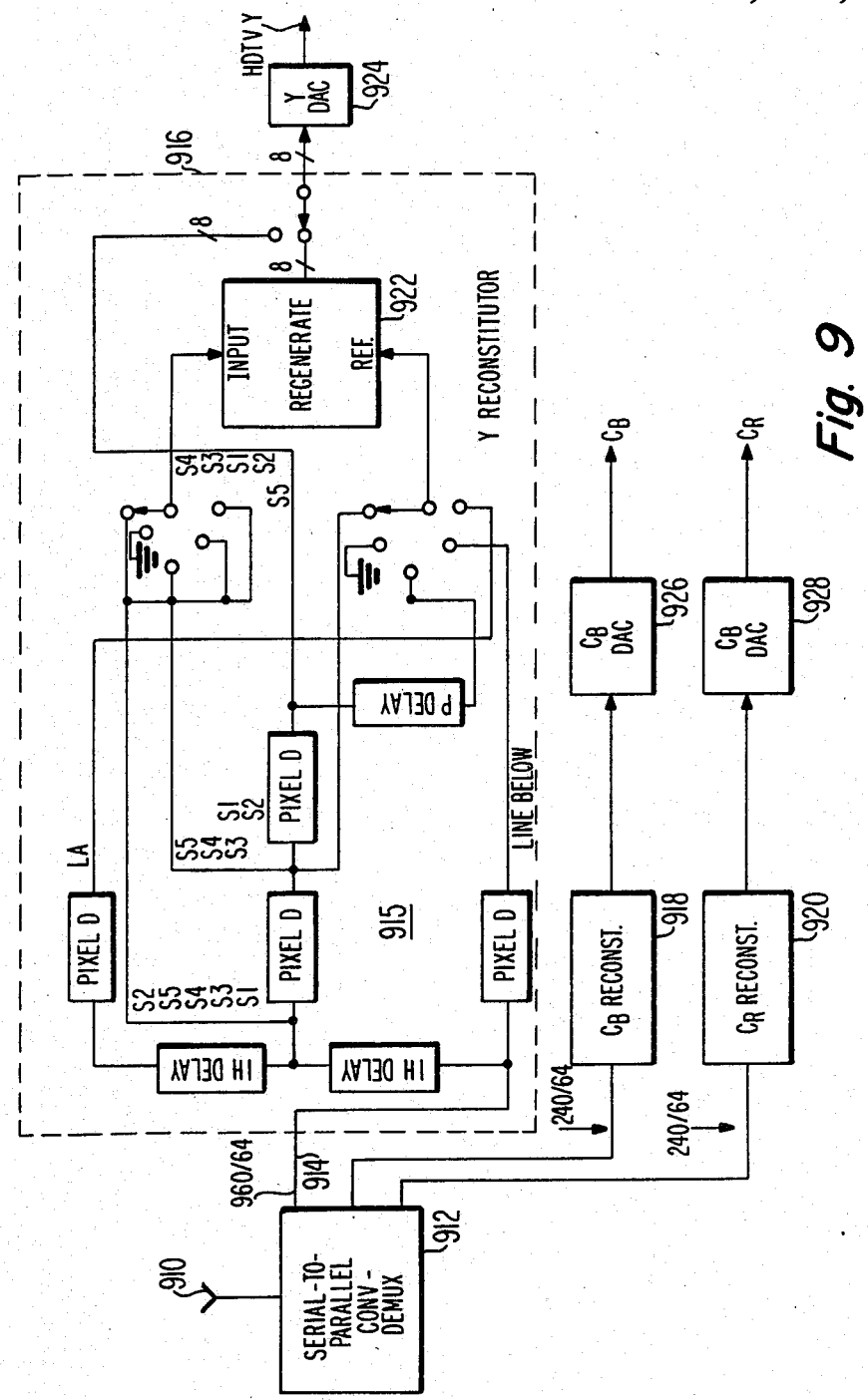
FIG. 9 is a block diagram of a decoder for reconstituting signals encoded by the encoder of FIG. 2.
Figure 10:
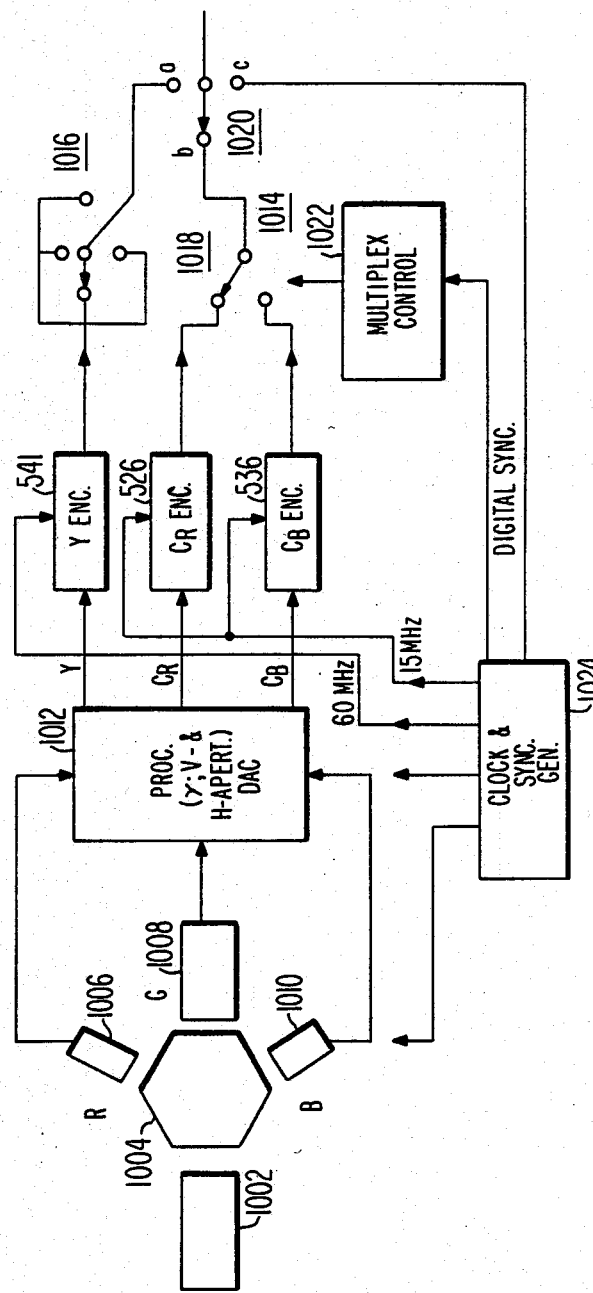
FIG. 10 is a block diagram of a color television camera including encoders according to the invention.

It will be noted that the reference pixel values under headings a–h of FIG. 8 range from 16 to 240. Values outside this range are not permitted under CCIR 601. In FIG. 9, signals serially encoded by an encoder 200 for each of Y, $C_B$ and $C_R$ as described in conjunction with FIG. 5 and arranged into a serial format of 1440 pixels per 64 microsecond line are applied by way of an input terminal 910 to a serial-to-parallel converter or demultiplexer 912, which produces 960 pixels per 64 microsecond line which is applied over conductor 914 to a Y reconstitutor designated generally as 916. Converter 912 also produces 240 pixels per 64 microsecond line $C_R$ and $C_B$ which are applied to reconstitutors 918 and 920, respectively. Reconstitutors 918 and 920 are similar to reconstitutor 916 and so are not explained further. Constitutor 916 includes a series of horizontal-line delays and pixel delays for generating a stream of signals suitable for application to the input and reference terminals of a regenerator 922. The delay arrangement of reconstitutor 916 differs slightly from the delay arrangement 212 because pixel S2 precedes pixel S1 in its arrival time, and the delays are arranged to produce at the output of reconstitutor 916 the groupings of pixels S1–S5 in sequential order. The 8-bit pixels at the output of reconstitutor 916 are applied to a digital-to-analog converter (DAC) 924 for producing a high definition luminance signal for application to a display apparatus for further signal processing. Similarly, the outputs of $C_B$ and $C_R$ reconstitutors 918 and 920 are applied to DACs 926 and 928, respectively, for producing medium-definition chrominance signals. FIG. 10 illustrates in block diagram form a television camera according to the invention. In FIG. 10, a lens 1002 focuses an image (not shown) through a color-spliting prism 1004 onto red (R), green (G) and blue (B) imagers 1006–1010, which are driven in response to timing signals from a clock generator 1024 to produce 31.27-$\mu$S lines of HDTV having 1600 pixels-per-line. The HDTV R, G, and B signals are applied to preamplifiers, gamma ($\gamma$) correction, vertical and horizontal-aperture-correction circuit and the like illustrated together as a processor block 1012. Matrixed and alternated digital Y, $C_R$, $C_B$ pixels are applied to Y, $C_R$ and $C_B$ encoders 514, 526 536 which are similar to encoder 200. The encoder pixels are multiplexed together by a conventional time-division multiplexer illustrated as 1014 and including switches 1016 and 1018 and 1020 controlled by a drive circuit 1022 for alternating Y, $C_R$ and $C_B$ pixels as described in conjunction with FIG. 5, and also including a further switch position C for switch 1020 coupled to receive sync signals from generator 1024 as required to identify lines and fields.

Figure 11:
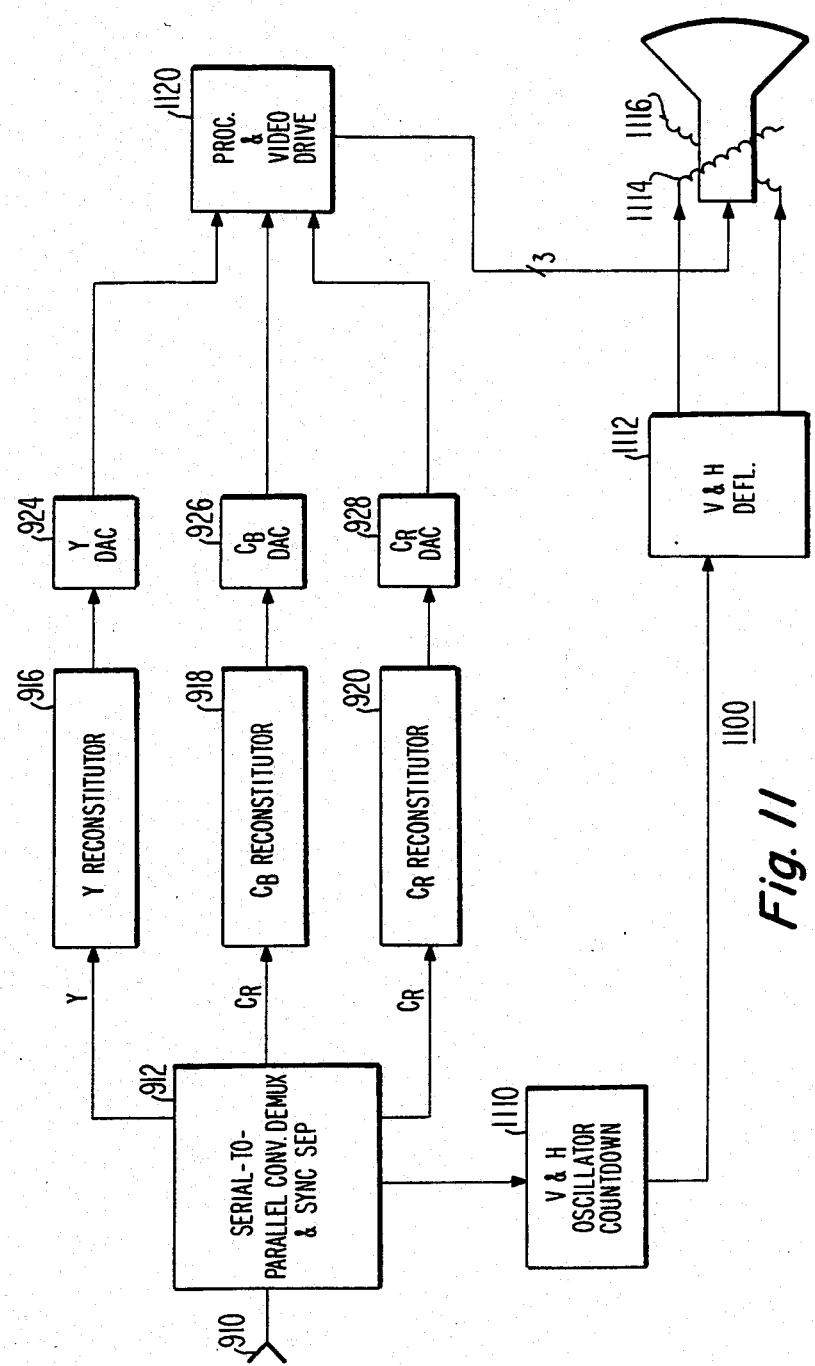
FIG. 11 is a block diagram of a monitor for display of signals according to the invention.

FIG. 11 illustrates a display monitor apparatus 1100 for receiving and displaying signals generated as described in conjunction with FIGS. 1–10. A serial data stream is applied by way of input terminal 910 to demultiplexer 912 which separates Y, $C_R$ and $C_B$ signals onto separate lines for application to reconstitutors 916–120 and which separates the unique synchronizing signals for application to a synchronizing circuit 1110 which controls clocking for the entire display and also generates deflection drive signals by use of a horizontal oscillator (not shown) and vertical count-down circuits (not shown). The deflection drive signals are applied to vertical and horizontal deflection circuits illustrated together as 1112, which generate vertical and horizontal deflection currents for applicatin to vertical (1114) and horizontal (1116) deflection windings associated with a color kinescope 1130. Reference (S2) and reconstituted (S1, S3–S5) pixels are applied from reconstitutors 916–920 to DACs 924–928, respectively, for generating streams of analog Y, R-Y and B-Y signals which are processed by conventional analog monitor signal processing and video drive circuits illustrated together as a block 1120, and applied to the cathodes and or grids (not shown) of kinescope 1130 to generate a HDTV display.

Other embodiments of the invention will be obvious to those skilled in the art. For example, instead of a full bit depth of 8 bits and a difference-signal bit depth of 4 bits, more or less than 4-bit difference samples can be used for the difference with 8-bit full bit depth, and more or less than 8 bits can be used to represent the full bit depth. In addition, the 4 samples associated with each central sample can be transmitted. The combiner by which the difference or delta signals are combined to form full-bit-depth signals may combine more than two delta signals if the bit depth of the delta signals is less than half the full bit depth; for example, three 3-bit delta signals may be combined if the full bit depth is 9 bits. The delay lines required to generate the various delayed samples may be accomplished by means of digital memories, or by CCD (clocked) or glass delay lines. Antialias filters may be used as required to reduce aliasing resulting from sample deletion.

What is claimed is:

1. A method for compressing digital data in the form of time-sequential television pixels representing successive raster lines, each pixel including N bits comprising the recurrent steps of:
    organizing said pixels into recurrent groups of first, second, third, fourth and fifth time-sequential pixels, each group of pixels of a given raster line being offset horizontally by two pixel positions with respect to a group of pixels of a preceding line;
    transmitting each second pixel of each group with a resolution of N-bits;
    comparing said first and third pixels with said second pixel located therebetween for each said group to produce first and second N/2 bit delta signals representing the difference between said second pixel and said first and third pixels, respectively;
    transmitting each said N/2-bit first delta signal of a given group before transmitting said second pixel of said given group;
    transmitting each said N/2-bit second delta signal of said given group after transmitting said second pixel of said given group;
    comparing said fourth pixel of said given group with said second pixel having a corresponding horizontal position on one of the next upper and next lower horizontal lines to produce an N/2-bit third delta signal representing the difference between said fourth and second vertically adjacent pixels;
    transmitting said third delta signal immediately after said second delta signal of said given group;
    comparing said fifth pixel of said given group with said second pixel having a corresponding horizontal position on the other of said next upper and next lower horizontal lines to produce an N/2-bit fourth delta signal representing the difference between said fifth and second vertically adjacent pixels; and
    transmitting said fourth delta signal immediately after said third delta signal of said given group.

2. A method according to claim 1 wherein N equals 8 and N/2 equals 4.

3. A method according to claim 1 wherein the values of N/2-bit delta signals are nonlinearly related to the magnitude of the differences which they represent.

4. A method for compressing digital data in the form of time-sequential television pixels representing successive raster lines, each pixel including N bits comprising the recurrent steps of:
    organizing said pixels into recurrent groups of first, second, third, fourth and fifth time-sequential pixels, each group of pixels of a given raster line being offset horizontally by two pixel positions with respect to a group of pixels of a preceding line
    transmitting each second pixel of each group with a resolution of N-bits;
    comparing said first and third pixels with said second pixel located therebetween for each said group to produce first and second M-bit delta signals representing the difference between said second pixel and said first and third pixels, respectively; where M is a number of bits less than N;
    transmitting each said M-bit first delta signal of a given group before transmitting said second pixel of said given group;
    transmitting each said M-bit second delta signal of said given group after transmitting said second pixel of said given group;
    comparing said fourth pixel of said given group with said second pixel having a corresponding horizontal position on one of the next upper and next lower horizontal lines to produce an M-bit third delta signal representing the difference between said fourth and second vertically adjacent pixels;
    transmitting said third delta signal immediately after said second delta signal of said given group;
    comparing said fifth pixel of said given group with said second pixel having a corresponding horizontal position on the other of said next upper and next lower horizontal lines to produce an M-bit fourth delta signal representing the difference between said fifth and second vertically adjacent pixels; and
    transmitting said fourth delta signal immediately after said third delta signal of said given group.

5. A method for compressing digital picture information, comprising:
    transmitting a first pixel-representative word at full bit depth;
    comparing a second pixel-representative word with said first pixel-representative word to form a difference word representative of the amplitude difference between said first and second words;
    encoding said difference word to form a delta word having less than said full bit depth, said encoding comprising subjecting said difference word to a plurality of non-linear encoding transfer functions, each said transfer function having a first region representing small amplitude increments when said amplitude difference represented by said difference word is small and having at least one second region representing large amplitude differences when said amplitude difference represented by said difference signal is large and
    selecting a given one of said transfer functions for encoding said difference word as a function of the amplitude of said first pixel-representative word to thereby provide an encoded delta word having greater accuracy for small differences over a range of values of said amplitude of said first pixel representative word.

6. A method for transmitting N-bit digital television representative signals through a transmission path, comprising:
    organizing said digital signals into recurrent groups of five time-adjacent samples representative of horizontally-adjacent pixels on each one of a plurality of lines of said television representative signal;

offsetting each group of samples by two pixel positions from line-to-line;

comparing first and second samples of a group of a first one of said lines with a second sample of said group to form first and second difference signals, respectively;

comparing a fourth sample of said group with the second sample of a group on a second horizontal line adjacent said first horizontal line to form a third difference signal;

comparing a fifth sample of said group with the second sample of a group on a third horizontal line adjacent said first horizontal line to produce a fourth difference signal;

representing each of said first, second, third and fourth difference signals by words of M bits, where M is less than N bits;

transmitting said first, second, third and fourth difference signals of M bits and said N-bit second signal.

7. A method according to claim 6 wherein said N-bit words have 8 bits.

8. A method according to claim 6 wherein said M-bit words have 4 bits.

9. A method according to claim 6 wherein said transmission path comprises video record means.

10. A method for reconstituting digital picture information encoded in a format in which a first pixel is transmitted in unencoded form as an N-bit word and a second pixel is transmitted in an encoded form as an M-bit delta word, M being less than N, said delta word being encoded as given one of a plurality of non-linear functions of an amplitude difference between said first and second pixels, said given non-linear function being selected in accordance with the amplitude of said N-bit word, comprising:

receiving said N-bit pixel and M-bit delta words;

selecting one of a plurality of decoding transfer functions in accordance with a given number of most significant bits of said N-bit pixel word;

applying said M-bit delta word to said transfer function selected by said N-bit word to regenerate said amplitude difference between said first and second pixels; and combining said N-bit word with said regenerated amplitude difference to reconstitute said second pixel with a resolution of N-bits.

* * * * *